US012382210B2

(12) United States Patent
Wang et al.

(10) Patent No.: US 12,382,210 B2
(45) **Date of Patent: *Aug. 5, 2025**

(54) EARPHONES

(71) Applicant: SHENZHEN SHOKZ CO., LTD., Guangdong (CN)

(72) Inventors: Zhen Wang, Shenzhen (CN); Zhiqing Liu, Shenzhen (CN); Yonggen Wang, Shenzhen (CN); Xinnan Mao, Shenzhen (CN); Fen You, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,484

(22) Filed: Apr. 22, 2024

(65) Prior Publication Data

US 2024/0267668 A1 Aug. 8, 2024

Related U.S. Application Data

(63) Continuation of application No. 17/809,013, filed on Jun. 27, 2022, which is a continuation of application No. PCT/CN2021/089713, filed on Apr. 25, 2021.

(30) Foreign Application Priority Data

Apr. 30, 2020 (CN) ........................ 202010367108.X
Apr. 30, 2020 (CN) ......................... 202020720094.0
Apr. 30, 2020 (CN) ........................ 202020720106.X

(51) Int. Cl.
*H04R 1/10* (2006.01)
*H04R 5/033* (2006.01)
*H04R 9/06* (2006.01)

(52) U.S. Cl.
CPC .......... *H04R 1/105* (2013.01); *H04R 1/1025* (2013.01); *H04R 1/1041* (2013.01);
(Continued)

(58) Field of Classification Search
CPC .... H04R 1/1025; H04R 1/1041; H04R 1/105; H04R 1/1058; H04R 1/1075;
(Continued)

(56) References Cited

U.S. PATENT DOCUMENTS 7,436,974 B2 10/2008 Harper
8,712,087 B2 * 4/2014 Ozawa ................ H04R 1/1016 381/328

(Continued)

FOREIGN PATENT DOCUMENTS

CA 3103582 A1 12/2019
CN 103079135 A 5/2013

(Continued)

OTHER PUBLICATIONS

International Search Report in PCT/CN2021/089713 mailed on Jul. 9, 2021, 5 pages.

(Continued)

*Primary Examiner* — Huyen D Le
(74) *Attorney, Agent, or Firm* — METIS IP LLC

(57) ABSTRACT

The present disclosure provides an earphone including a core module. The core module may include a core housing and a core. The core housing may include a bottom wall and an annular peripheral wall. When a user wears the earphone, the bottom wall may face the head of the user. One end of the annular peripheral wall may be integrally connected with the bottom wall, the other end of the annular peripheral wall that is away from the bottom wall includes an opening, and the core may be disposed in the core housing through the opening. The core may include a magnet configured such
(Continued)

that the core module is attachable to a magnetic object through one side of the bottom wall.

20 Claims, 19 Drawing Sheets

(52) U.S. Cl.
CPC ......... *H04R 1/1058* (2013.01); *H04R 1/1075* (2013.01); *H04R 5/033* (2013.01); *H04R 9/066* (2013.01); *H04R 2201/105* (2013.01); *H04R 2460/13* (2013.01)

(58) Field of Classification Search
CPC ............ H04R 1/2811; H04R 2201/105; H04R 2201/107; H04R 5/033; H04R 9/066; H04R 2460/13
See application file for complete search history.

(56) References Cited

U.S. PATENT DOCUMENTS

| | | | |
|---|---|---|---|
| 8,891,798 B1 | 11/2014 | Laffon De Mazieres et al. | |
| 9,426,556 B2 | 8/2016 | Boni | |
| 11,115,751 B2 | 9/2021 | Zheng et al. | |
| 11,388,506 B2 * | 7/2022 | Wang | H04R 1/105 |
| 2009/0147971 A1 | 6/2009 | Kuhr et al. | |
| 2013/0163791 A1 | 6/2013 | Qi et al. | |
| 2014/0140561 A1 | 5/2014 | Lee et al. | |
| 2015/0195639 A1 | 7/2015 | Azmi et al. | |
| 2016/0050477 A1 | 2/2016 | Ushakov | |
| 2016/0057530 A1 | 2/2016 | Anderson et al. | |
| 2017/0111728 A1 | 4/2017 | Kim et al. | |
| 2019/0379987 A1 | 12/2019 | Breitenfeld et al. | |
| 2020/0068308 A1 | 2/2020 | Hosoi et al. | |
| 2020/0336824 A1 | 10/2020 | Zheng et al. | |
| 2022/0303665 A1 | 9/2022 | Zhang et al. | |
| 2024/0348971 A1 * | 10/2024 | Fu | H04R 9/066 |

FOREIGN PATENT DOCUMENTS

| | | | |
|---|---|---|---|
| CN | 204131678 | U | 1/2015 |
| CN | 205726299 | U | 11/2016 |
| CN | 105072538 | B | 3/2017 |
| CN | 110677760 | A | 1/2020 |
| CN | 210093555 | U | 2/2020 |
| CN | 211702349 | U | 10/2020 |
| CN | 211702350 | U | 10/2020 |
| KR | 20040101965 | A | 12/2004 |
| KR | 20100072775 | A | 7/2010 |
| WO | 2012002605 | A1 | 1/2012 |

OTHER PUBLICATIONS

Office Action in Russian Application No. 2022118487 mailed on Mar. 23, 2023, 14 pages.
The Extended European Search Report in European Application No. 21797782.6 mailed on Jun. 6, 2023, 11 pages.
First Examination Report in Indian Application No. 202217039601 mailed on Aug. 3, 2023, 7 pages.
Notice of Preliminary Rejection in Korean Application No. 10-2022-7031765 mailed on Sep. 19, 2023, 12 pages.
Communication Pursuant to Article 94(3) EPC in European Application No. 21797782.6 mailed on May 13, 2025, 5 pages.

* cited by examiner

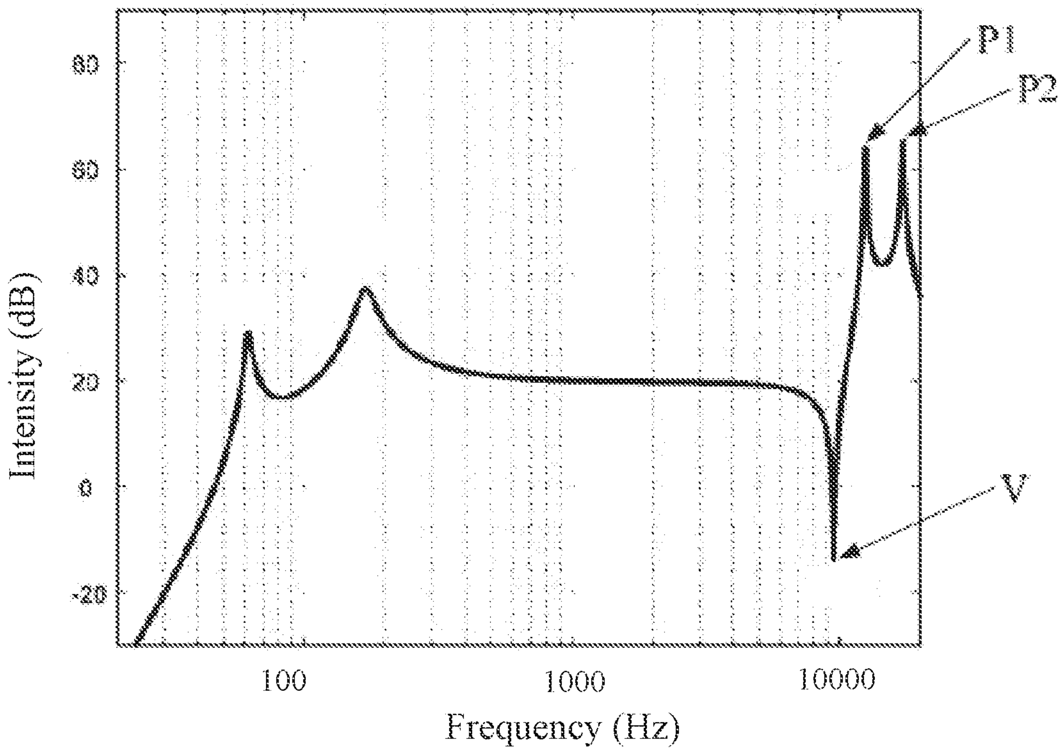
FIG. 9
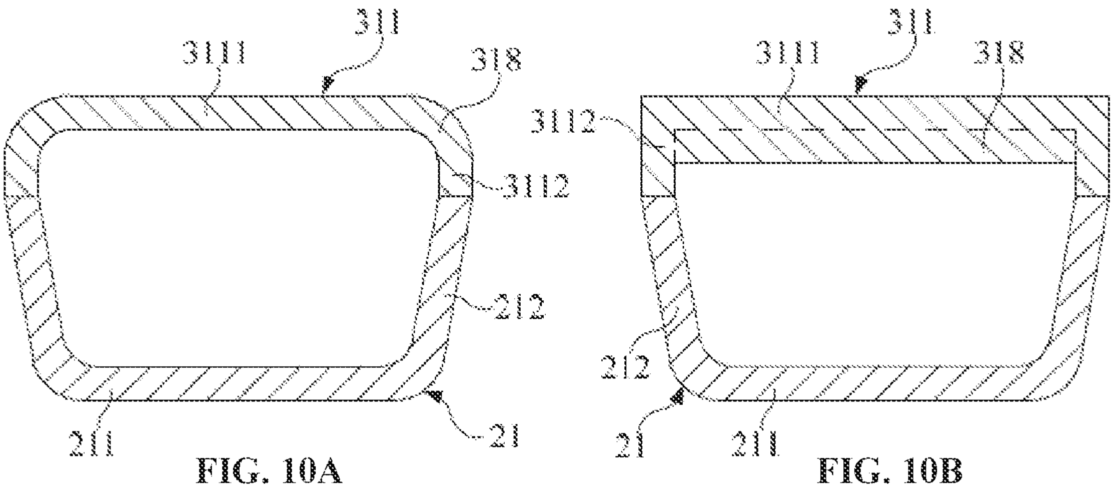
FIG. 10A
FIG. 10B

II-II

III-III

EARPHONES

CROSS-REFERENCE TO RELATED APPLICATIONS

This application is a Continuation of U.S. patent application Ser. No. 17/809,013, filed on Jun. 27, 2022, which is a Continuation of International Application No. PCT/CN2021/089713, filed on Apr. 25, 2021, which claims priority of Chinese Patent Application No. 202020720094.0, filed on Apr. 30, 2020, priority of Chinese Patent Application No. 202020720106.X, filed on Apr. 30, 2020, and priority of Chinese Patent Application 202010367108.X, filed on Apr. 30, 2020, the entire contents of each of which are incorporated herein by reference.

TECHNICAL FIELD

The present disclosure relates to technical fields of acoustics, and in particular, to earphones.

BACKGROUND

With the development of acoustic output technology, an acoustic output device such as an earphone has been widely used. Compared with traditional in-ear and over-ear earphones, an open-ear earphone is designed as a portable acoustic output device that achieves sound conduction within a specific range, without blocking or covering the ear canal. Taking a bone conduction earphone as an example, bone conduction is a sound conduction manner. That is, electrical signals are converted into mechanical vibrations. The mechanical vibrations are transmitted through the skull, the bony labyrinth, the endolymph, the spiral organ, the cochlear nerve, the auditory pathway in the cerebral cortex of a human, etc. A bone conduction earphone may receive sound using the bone conduction. The bone conduction earphone may be close to the skull. Sound waves may be transmitted directly to the auditory nerve through the bones without passing through the external auditory meatus and the eardrum, which may "liberate" both ears.

SUMMARY

According to an aspect of the present disclosure, an earphone is provided. The earphone may include a core module. The core module may include a core housing and a core. The core housing may include a bottom wall and an annular peripheral wall. When a user wears the earphone, the bottom wall may face the head of the user, one end of the annular peripheral wall may be integrally connected with the bottom wall, the other end of the annular peripheral wall that is away from the bottom wall including an opening, and the core may be disposed in the core housing through the opening. The core may include a magnet configured such that the core module is attachable to a magnetic object through one side of the bottom wall.

In some embodiments, the magnet may be a cylinder, a diameter of the magnet may be larger than or equal to a first diameter and less than or equal to a second diameter, and a thickness of the magnet may be larger than or equal to a first thickness and less than or equal to a second thickness.

In some embodiments, the diameter of the magnet may be 10.8 mm, and the thickness of the magnet may be 3.5 mm.

In some embodiments, the core may further include a magnetic conduction shield, a magnetic conduction plate and a coil. The magnetic conduction shield may include a bottom plate and an annular side plate integrally connected with the bottom plate, and the magnet may be disposed in the annular side plate and fixed on the bottom plate. The magnetic conduction plate may be fixed on one side of the magnet that is away from the bottom plate. The coil may be disposed in a magnetic gap between the magnet and the annular side plate.

In some embodiments, a diameter of the magnetic conduction plate may be equal to a diameter of the magnet, and a thickness of the magnetic conduction plate may be equal to a thickness of the magnetic conduction shield.

In some embodiments, the thickness of the magnetic conduction shield may be larger than or equal to a third thickness and less than or equal to a fourth thickness.

In some embodiments, the thickness of the magnetic conduction shield may be 0.5 mm.

In some embodiments, a height of the annular side plate may be larger than or equal to a first height and less than or equal to a second height.

In some embodiments, the height of the annular side plate may be 3.7 mm.

In some embodiments, the core module may further include a core bracket. The core bracket may be disposed in the core housing, and the coil may be fixed on the core bracket.

In some embodiments, the magnetic gap between the magnet and the annular side plate may be larger than or equal to a first gap and less than or equal to a second gap.

In some embodiments, the earphone may further include an ear hook assembly, and one end of the ear hook assembly may be connected to the core module.

In some embodiments, the ear hook assembly may include an ear hook housing. The ear hook housing may include an accommodation bin, a fixing portion and a bending transition portion. The accommodation bin may be configured to accommodate a battery or a main control circuit board. The fixing portion may be covered on an opening end of the core housing to form a chamber for accommodating the core. The bending transition portion may connect the accommodation bin and the fixing portion, and may be disposed in a bent shape to be hung on an outside of an ear of the user.

In some embodiments, an elastic modulus of the core housing may be larger than an elastic modulus of the ear hook housing.

In some embodiments, the fixing portion may be disposed with a reinforcing structure, a ratio of a difference between a rigidity of the bottom wall and a rigidity of the fixing portion and the rigidity of the bottom wall may be less than or equal to a preset ratio threshold.

In some embodiments, the reinforcing structure may include a reinforcing rib disposed on the fixing portion.

In some embodiments, a material of the reinforcing structure may include a metal piece. The reinforcing structure and the fixing portion of the earphone may be integrally formed by metal insert injection molding.

In some embodiments, the core module may further include a cover plate. The cover plate may be covered on the opening of the annular peripheral wall of the core housing, and the fixing portion may be covered on one side of the cover plate that is away from the core housing.

In some embodiments, an elastic modulus of the cover plate may be larger than an elastic modulus of the ear hook housing.

In some embodiments, the elastic modulus of the cover plate may be less than or equal to an elastic modulus of the core housing.

In some embodiments, the ear hook assembly may further include a decoration bracket. A first groove may be disposed on the bending transition portion. The decoration bracket may be embedded and fixed in the first groove to form a wiring channel such that a wire extends from the core module into the accommodation bin through the wire channel.

In some embodiments, a button adaptation hole may be disposed on the fixing portion of the earphone, and the button adaptation hole may be in communication with one end of the first groove. The ear hook assembly may further include a button, the button may be disposed on the other side of the ear hook housing that is away from the decoration bracket, and exposed through the button adaptation hole.

In some embodiments, the decoration bracket may extend to a top of the button in a form of cantilever and may be able to trigger the button when pressed by an external force, the button may be exposed through the button adaptation hole.

In some embodiments, the earphone may include two core modules. Magnets of the two core modules may have different polarities on one side close to the bottom wall of the core housing, when the earphone is in a non-wearing state, the two core modules may be attractable to each other.

In some embodiments, the earphone may include two ear hook assemblies and a rear hook assembly configured to circumferentially disposed at a rear side of the user's head. Two ends of the rear hook assembly may be respectively connected with accommodation bins of the two ear hook assemblies.

Additional features will be set forth in part in the following description, and will become apparent to those skilled in the art upon review of the following content and drawings, or may be learned by actual production or operation. The features of the present disclosure may be realized and obtained by practicing or using the various aspects of the methods, tools and combinations set forth in the following detailed embodiments.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 9 is a schematic diagram illustrating a frequency response curve of a bone conduction earphone according to some embodiments of the present disclosure;

FIG. 10A and FIG. 10B are schematic diagrams illustrating cross-sectional views of a reinforcing structure disposed on the ear hook housing in FIG. 8 according to some embodiments of the present disclosure;

DETAILED DESCRIPTION

Figure 1:
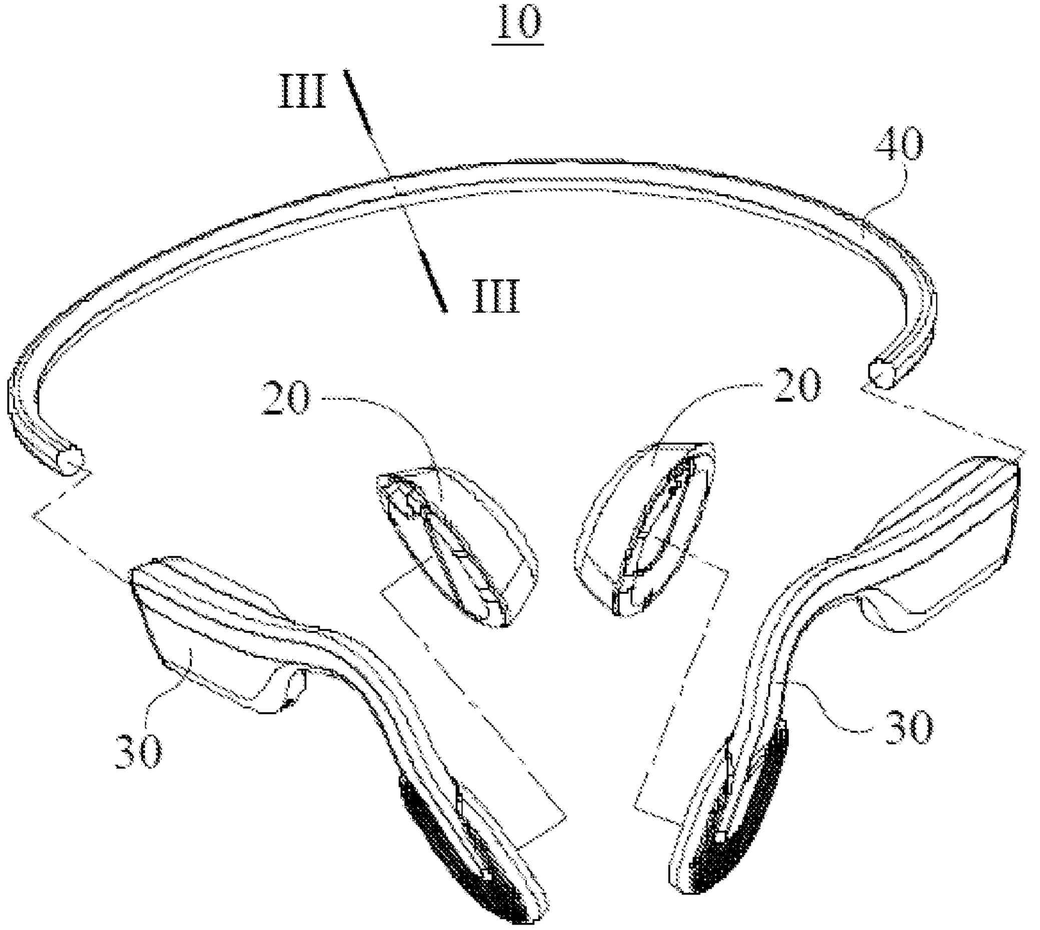
FIG. 1 is a schematic diagram illustrating a breakdown structure of a bone conduction earphone according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. It should be understood that the exemplary embodiments are provided merely for better comprehension and application of the present disclosure by those skilled in the art, and not intended to limit the scope of the present disclosure. Unless obviously obtained from the context or the context illustrates otherwise, the same numeral in the drawings refers to the same structure or operation.

As used in the disclosure and the appended claims, the singular forms "a," "an," and "the," include plural referents unless the content clearly dictates otherwise. In general, the terms "comprise," "comprising," "include," and/or "including" when used in this disclosure, specify the presence of stated features, integers, steps, operations, elements, and/or components, but do not preclude the presence or addition of one or more other features, integers, steps, operations, elements, components, and/or groups thereof. The term "based on" is "based at least in part on". The term "one embodiment" means "at least one embodiment". The term "another embodiment" means "at least one additional embodiment." Relevant definitions of other terms will be given in the description below. Without loss of generality, the description of "an acoustic output device" or "an earphone" will be used below when describing the conduction-related technology in the present disclosure. This description is only a form of conductive application, and for those of ordinary skill in the art, "an acoustic output device" or "an earphone" may also be replaced by other similar words, such as "a speaker", "a sound-generating device", "a hearing aid" or "a speaker device" etc. In fact, the various implementations of the present disclosure can be easily applied to other non-speaker hearing devices. For example, for those skilled in the art, after understanding the basic principle of an earphone, various modifications and changes in form and details may be made to the specific methods and steps of implementing the earphone without departing from this principle. In particular, the ambient sound pickup and processing functions are added to the earphone, so that the earphone can function as a hearing aid. For example, a microphone such as a microphone can pick up sound of the surrounding environment of a user/wearer, and under a certain algorithm, the sound is processed (or the generated electrical signal) and transmitted to the acoustic output part. That is, the earphone can be modified to add the function of picking up the ambient sound, and after a certain signal processing, the sound can be transmitted to the user/wearer through the acoustic output module, to realize the function of the acoustic output device and the traditional acoustic output device at the same time. As an example, the algorithms mentioned here may include noise cancellation, automatic gain control, acoustic feedback suppression, wide dynamic range compression, active environment recognition, active anti-noise, directional processing, tinnitus processing, multi-channel wide dynamic range compression, active whistling suppression, volume control, or the like, or any combination thereof.

An earphone in the present disclosure may be a separate, ready-to-use earphone, or an earphone that is plugged into or used as a part of an electronic device. For illustrative purposes only, the following will be further described based on a bone conduction earphone. It should be noted that the content described below may also be applied to an air conduction earphone.

Figure 2:
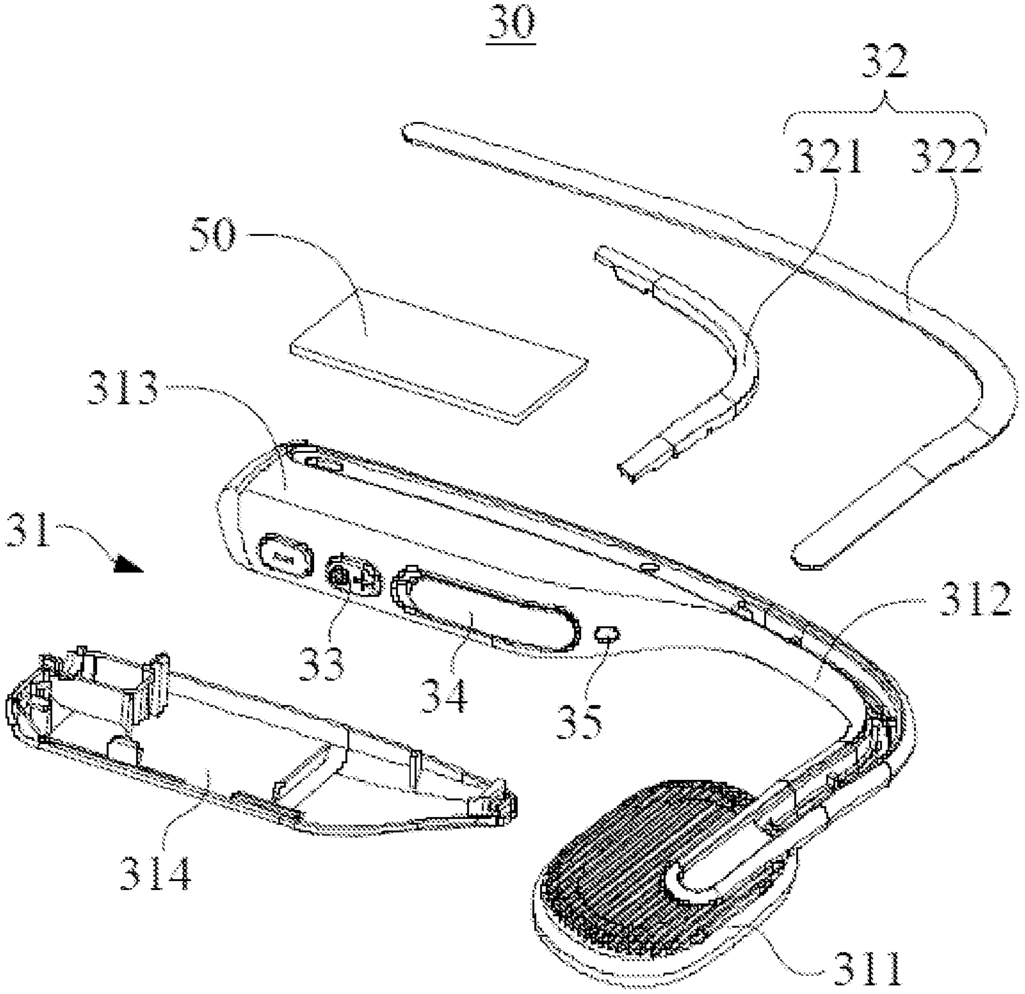
FIG. 2 is a schematic diagram illustrating a breakdown structure of an ear hook assembly of the bone conduction earphone in FIG. 1 according to some embodiments of the present disclosure.
Figure 3:
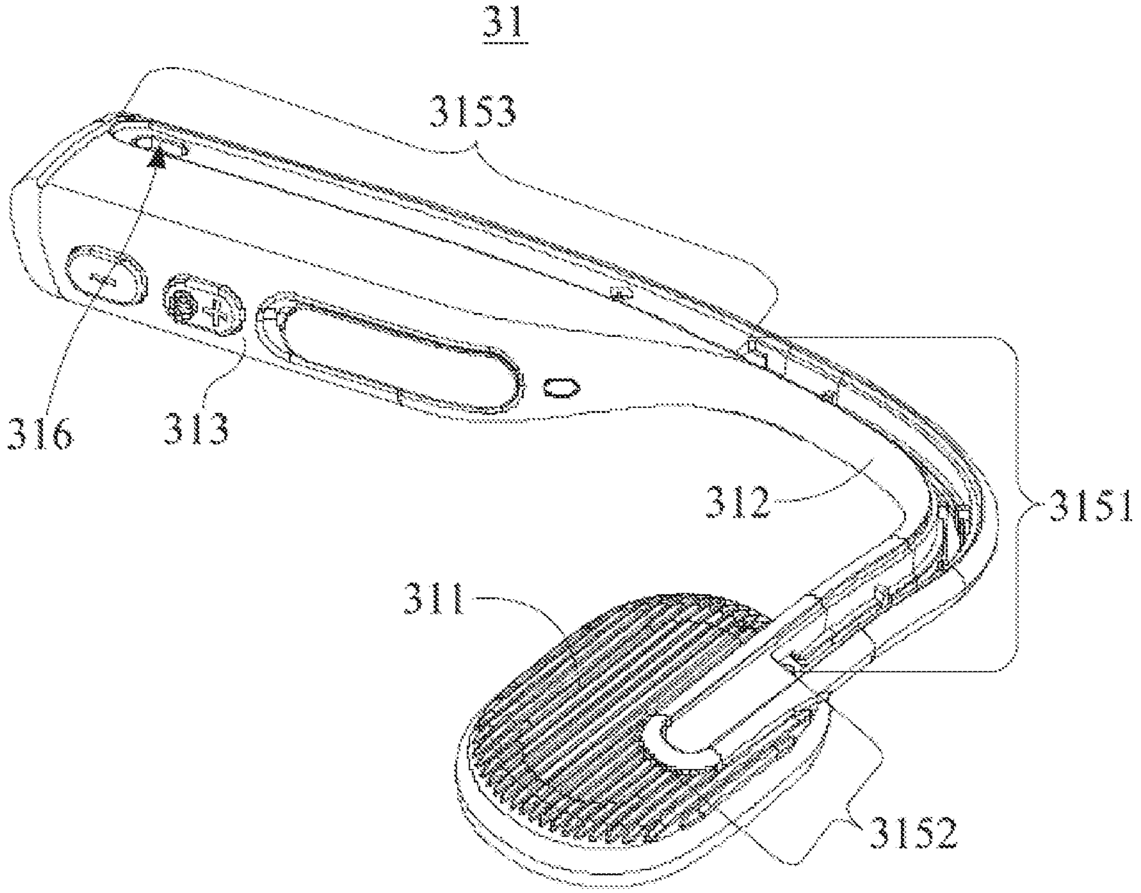
FIG. 3 is a schematic diagram illustrating a structure of an ear hook housing of the ear hook assembly in FIG. 2 according to some embodiments of the present disclosure.
Figure 4:
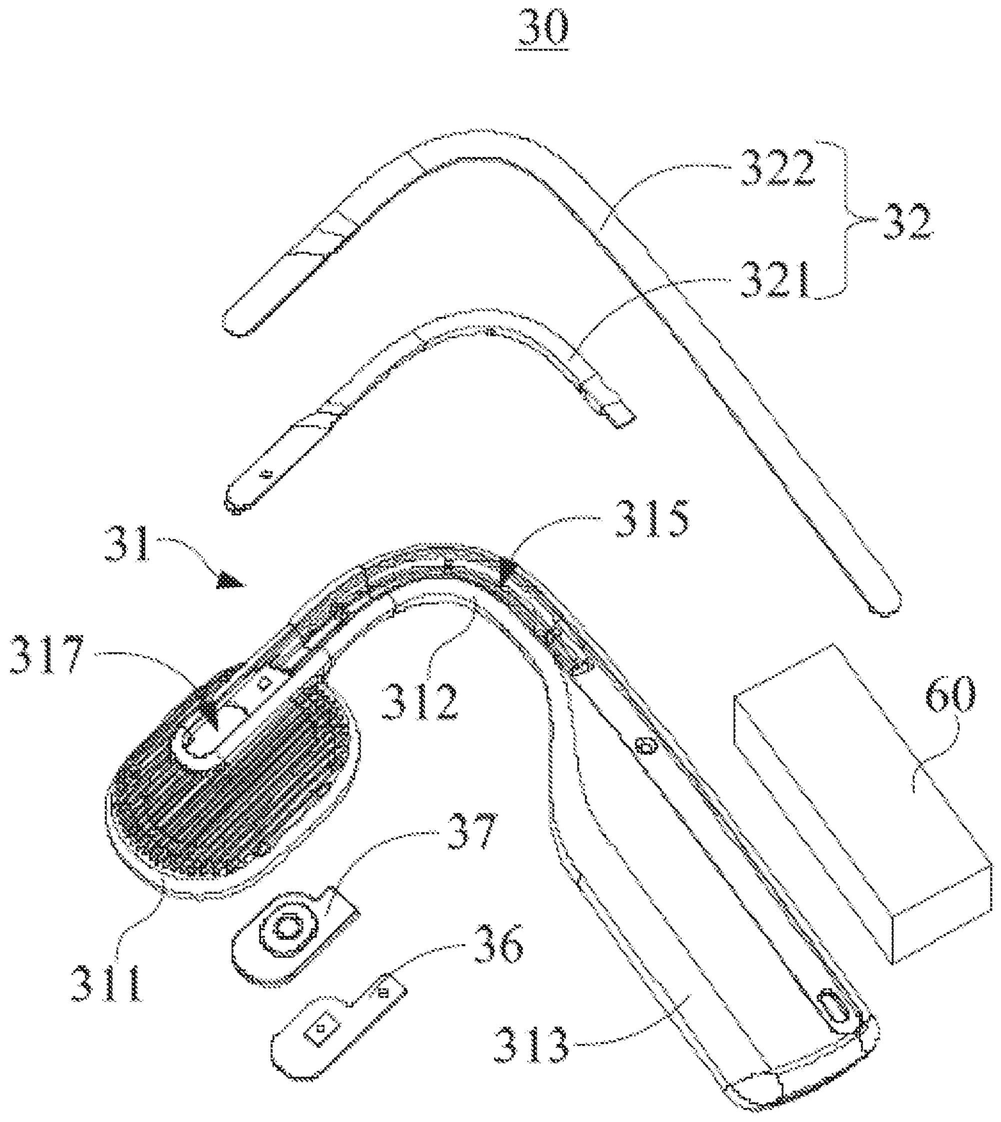
FIG. 4 is a schematic diagram illustrating another breakdown structure of an ear hook assembly in FIG. 1 according to some embodiments of the present disclosure.
Figure 5:
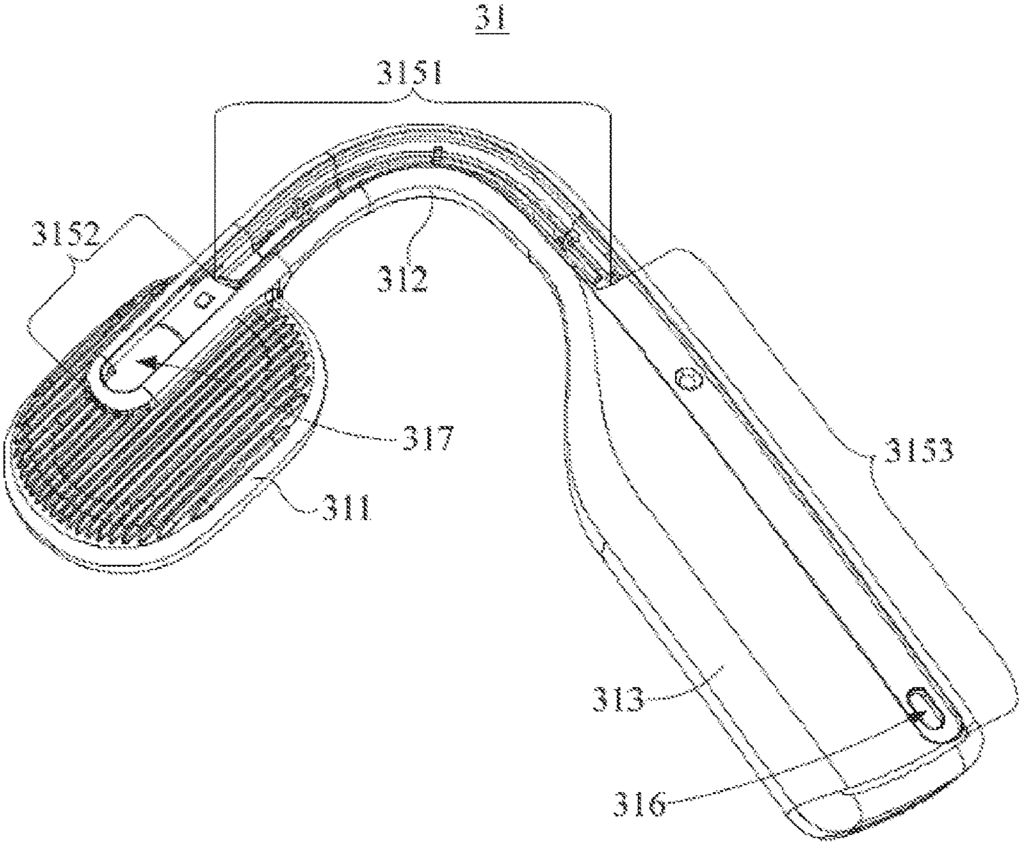
FIG. 5 is a schematic diagram illustrating a structure of an ear hook housing of the ear hook assembly in FIG. 4 according to some embodiments of the present disclosure.

FIG. 1 is a schematic diagram illustrating a breakdown structure of a bone conduction earphone according to some embodiments of the present disclosure. FIG. 2 is a schematic diagram illustrating a breakdown structure of an ear hook assembly of the bone conduction earphone in FIG. 1 according to some embodiments of the present disclosure. FIG. 3 is a schematic diagram illustrating a structure of an ear hook housing of the ear hook assembly in FIG. 2 according to some embodiments of the present disclosure. FIG. 4 is a schematic diagram illustrating a breakdown structure of an ear hook assembly of the bone conduction earphone in FIG. 1 according to some embodiments of the present disclosure. FIG. 5 is a schematic diagram illustrating a structure of an ear hook housing of the ear hook assembly in FIG. 4 according to some embodiments of the present disclosure. As shown in FIGS. 1-5, the bone conduction earphone 10 may include two core modules 20, two ear hook assemblies 30, a rear hook assembly 40, a main control circuit board 50, and a battery 60. One end of each of the two ear hook assemblies 30 may be connected to a corresponding core module 20. Each of the two ends of the rear hook assembly 40 may be connected with the other end of one of the two ear hook assemblies 30 away from the core module 20. Further, each of the two ear hook assemblies 30 may be configured to be hung outside an ear of a user. The rear hook assembly 40 may be configured to circumferentially disposed at a rear side of the user's head so as to satisfy requirements that the user wears the bone conduction earphone 10. Therefore, when a user wears the bone conduction earphone 10, the two core modules 20 may be located on left and right sides of the user's head, respectively. Under a cooperation between the two ear hook assemblies 30 and the rear hook assembly 40, the two core modules 20 may be in contact with the user's skin by clamping the user's head to transmit sound based on the bone conduction.

It should be noted that two core modules 20 are described in the present disclosure, and both core modules 20 may emit sound such that the bone conduction earphone 10 may achieve stereo sound effects, thereby improving the user's favorability of the bone conduction earphone 10. In some embodiments, the account of the core modules 20 may not be limited to two. For example, the bone conduction earphone 10 may include three or more core modules 20. As another example, in some application scenarios where stereophonic requirement is not particularly high, such as hearing aids for hearing patients, a live teleprompter for hosts, etc., the bone conduction earphone 10 may include only one core module 20. As another example, the earphone may further include an air conduction earphone (e.g., a single-ear air conduction earphone) provided with a core module 20, and the air conduction earphone may be hung on the user's auricle through a fixing component (e.g., an ear hook assembly), and transmits a sound signal to the user through one or more sound guiding holes.

In some embodiments, the main control circuit board 50 and the battery 60 may be disposed in the same ear hook assembly 30, or may be disposed in the two ear hook assemblies 30, respectively, and the specific structure will be described in detail below. The main control circuit board 50 and the battery 60 may both be connected to the two core modules 20 through a conductor (not shown in FIGS. 1-5), the main control circuit board 50 may be used to control a sound generation of the core module 20 (e.g., converting electricals signal into mechanical vibrations), and the battery 60 may be used to provide electrical energy to the bone conduction earphone 10 (specifically, the two core modules 20). In some embodiments, the bone conduction earphone 10 described in the present disclosure may further include components such as a microphone (e.g., a microphone, a pickup, etc.), a communication element (e.g., a blue-tooth, etc.), and these components may also be connected to the main control circuit board 50 and the battery 60, etc., through a wire, to realize a corresponding function.

In some embodiments, the conductor may include a leading wire for an electrical connection between various electronic components of the bone conduction earphone 10. If multiple circuits are to be electrically connected, the conductor may be in multiple strands, and the conductor may be simply understood as a plurality of leading wires.

As shown in FIG. 2, the ear hook assembly 30 may include an ear hook housing 31 and a decoration member 32. The ear hook housing 31 and the decoration member 32 may be connected through a glue connection, a clamping connection, a threaded connection, or the like, or any combination thereof. When a user wears the bone conduction earphone 10, the decoration member 32 may be located on one side of the ear hook housing 31 that is away from the core module 20. For example, the decoration member 32 may be located at an outside of the bone conduction earphone 10 to facilitate the decoration member 32 to decorate the ear hook housing 31, thereby increasing an appearance of the bone conduction earphone 10. In some embodiments, the decoration member 32 may be protruded from the ear hook housing 31.

Alternatively, the decoration member 32 may be embedded in the ear hook housing 31. In some embodiments, the decoration member 32 may include a sticker, a plastic piece, a metal piece, or the like, or any combination thereof. The decoration member 32 may be printed with a geometric pattern, a cartoon pattern, a logo pattern, etc. Alternatively, the decoration member 32 may also apply a fluorescent material, a reflective material, etc., to achieve the corresponding decoration effect.

As shown in FIG. 2 and FIG. 3, the ear hook housing 31 may include an earphone fixing portion 311, a bending transition portion 312, and an accommodation bin 313 that are sequentially connected. The earphone fixing portion 311 may be configured to fix the core module 20. A cooperation between the earphone fixing portion 311 and the core module 20 may be described in detail below. The bending transition portion 312 may be configured to connect the accommodation bin 313 and the earphone fixing portion 311. The bending transition portion 312 may be bent and disposed to be hung outside a human ear. In some embodiments, one end of the accommodation bin 313 away from the earphone fixing portion 311 may be connected to the rear hook assembly 40 by a connection (e.g., a glue connection, a clamping connection, a threaded connection, or the like, or any combination thereof) to connect the ear hook component 30 and the rear hook assembly 40. One end of the accommodation bin 313 may be disposed with an opening to accommodate the main control circuit board 50 and/or the battery 60. At this time, the ear hook housing 31 may further include a bin cover 314. The bin cover 314 may be disposed on an opening end of the accommodation bin 313.

In some embodiments, the bone conduction earphone 10 may further include a button module, an interface module, and the like. For example, when the accommodation bin 313 is configured to accommodate the main circuit board 50, as shown in FIG. 2, the ear hook assembly 30 may further include a control key 33 and a Type-C(or universal serial bus (USB)) interface 34. The control key 33 and the Type-C (USB) interface 34 may be disposed on the accommodation bin 313, such that the control key 33 and the Type-C(USB) interface 34 may be connected with the main control circuit board 50, thereby shortening a distance of a wiring. For example, the control key 33 and the TYPE-C(USB) interface 34 may be partially exposed to the ear hook housing 31 to facilitate the user to perform a corresponding operation. In such cases, the control key 33 may be configured to turn on/off the bone conduction earphone 10, adjust a volume, etc. The TYPE-C(USB) interface 34 may be configured to transmit data, charge, etc. Further, the ear hook assembly 30 may include an indicator light 35. The indicator light 35 may be disposed on the accommodation bin 313 to be connected with the main control circuit board 50, thereby shortening the distance of the wiring. In some embodiments, the indicator light 35 may be partially exposed to the ear hook housing 31 as shown in FIG. 2, or may further include a light source hiding in the ear hook housing 31 and a light guide member partially exposed outside the ear hook housing 31 (not shown in FIG. 2 and FIG. 3). In such cases, the indicator light 35 may be configured to prompt the user in a scenario that the bone conduction earphone 10 is charging, the power of the bone conduction earphone 10 is insufficient, etc.

In some embodiments, when a user wears the bone conduction earphone 10, the bone conduction earphone 10 may be hung outside the human ear. For example, the core module 20 may be located on a front side of the human ear. The main control circuit board 50 or the battery 60 may be located on a rear side of the human ear. For example, the human ear may be a fulcrum to support the bone conduction earphone 10. In such cases, most of the weight of the bone conduction earphone 10 may be bored by the human ear. It may be uncomfortable for the user after wearing the bone conduction earphone 10 for a long time. To this end, a soft material may be selected as a material of the ear hook housing 31 (especially the bending transition portion 312) such that a wearing comfort of the bone conduction earphone 10 may be improved. In some embodiments, the material of the ear hook housing 31 may include polycarbonate (PC), polyamide (PA), acrylonitrile-butadiene-styrene copolymer (ABS), polystyrene (PS), high impact polystyrene (HIPS), polypropylene (PP), polyethylene terephthalate (PET), Polyvinyl chloride (PVC), polyurethanes (PU), polyethylene (PE), phenol formaldehyde (PF), urea-formaldehyde (UF), melamine-formaldehyde (MF), silica gel, or the like, or any combination thereof. In some embodiments, since the material of the ear hook housing 31 is soft, a rigidity of the ear hook housing 31 may be insufficient. A structure of the ear hook housing 31 may not be maintained under an external force. The ear hook housing 31 may be broken since an insufficient strength. To this end, an elastic metal wire (not shown in FIG. 3) may be disposed in the ear hook housing 31 (at least the bending transition portion 312) to improve the strength of the ear hook housing 31, thereby increasing the reliability of the ear hook housing 31. A material of the elastic metal wire may include spring steel, titanium alloy, titanium nickel alloy, chromium molybdenum steel, or the like, or any combination thereof. In some embodiments, the ear hook housing 31 may be a structured piece integrally formed by metal insert injection molding.

Based on the above detailed description, since the core module 20 is disposed at one end of the ear hook assembly 30 (may be one end of the earphone fixing portion 311 specifically), the main control circuit board 50 or the battery 60 may be disposed on the other end of the ear hook assembly 30 (may be the other end of the accommodation bin 313 specifically). In such cases, when the core module 20 is connected with the main control circuit board 50 and the battery 60 through a leading wire, the leading wire may at least pass through a region where the bending transition portion 312 is located. For the appearance of the bone conduction earphone 10, the leading wire may not be exposed to the ear hook housing 31, but passed through the ear hook housing 31 such that the bending transition portion 312 may at least cover the leading wire. However, since the material of the leading wire is soft, it may be difficult for the leading wire to pass through the ear hook housing 31. To this end, as shown in FIGS. 2-5, in some embodiments, a first groove 315 may be disposed on the ear hook housing 31 (at least on the bending transition portion 312). The first groove 315 may be configured for wiring to reduce the difficulty that the leading wire passes through the ear hook housing 31. The first groove 315 may be disposed on one side of the ear hook housing 31 near the decoration bracket 321. At this time, the decoration member 32 may be embedded and fixed in the first groove 315 corresponding to the bending transition portion 312 to form a wiring channel (not shown in FIG. 2 and FIG. 4). In such cases, the leading wire may be extended into the accommodation bin 313 through the wiring channel in the core module 20 such that the core module 20 may be connected with the main control circuit board 50 and the battery 60 through the leading wire. In such cases, when the leading wire is passed through the ear hook housing 31 through the first groove 315, the decoration member 32 may cover the leading wire to avoid the leading wire naked outside the ear hook housing 31. At this time, the decoration member 32 may be configured to decorate the ear hook housing 31, and hide the leading wire, such that the decoration member 32 may achieve "one piece with dual purposes."

Figure 6:
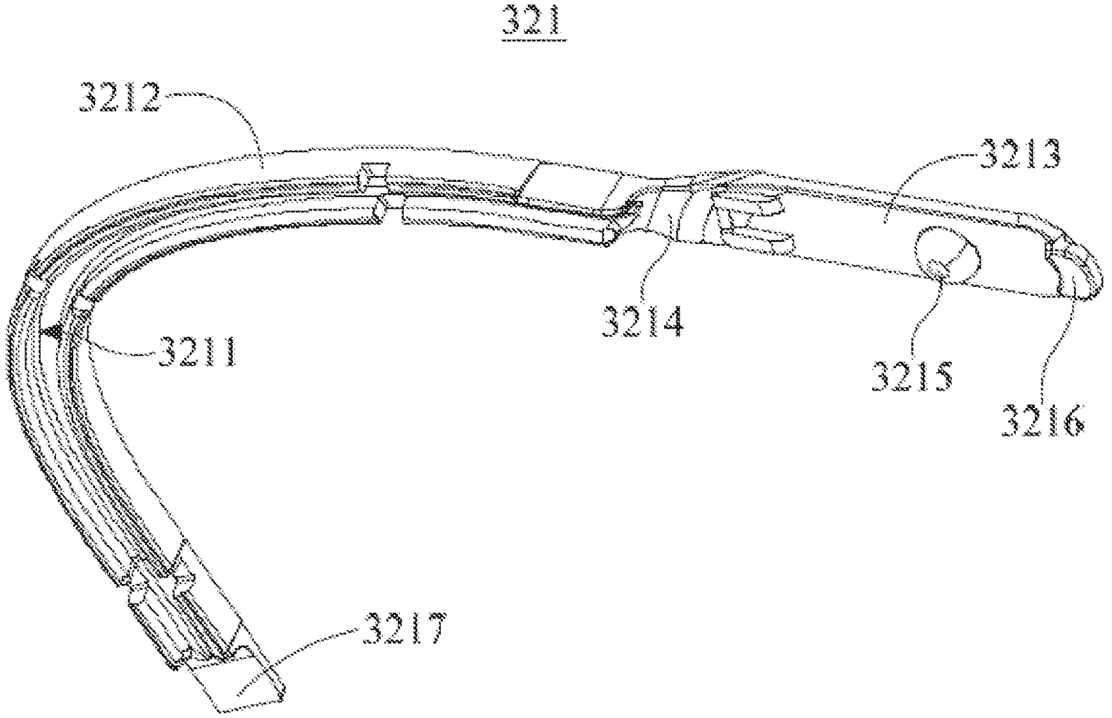
FIG. 6 is a schematic diagram illustrating a structure of a side of a decoration bracket close to the ear hook housing in FIG. 4 according to some embodiments of the present disclosure.

As shown in FIG. 2, the decoration member 32 may include a decoration bracket 321 and a decorative strip 322. The decoration bracket 321 may be bent and disposed corresponding to the bending transition portion 312. In such cases, when the decoration bracket 321 is embedded and fixed in the first groove 315 corresponding to the bending transition portion 312, the decoration bracket 321 and the first groove 315 on the bending transition portion 312 may be fitted to form a wiring channel. The leading wire may extend from the core module 20 to the accommodation bin 313 through the wiring channel. Further, the decoration strip 322 may be embedded in the first groove 315 and fixed to the decoration bracket 321. At this time, the decoration bracket 321 may include a plastic piece. The decoration bracket 321 may be assembled with the ear hook housing 31 by a glue connection and/or a clamping connection. The decoration strip 322 may include a sticker. The decoration strip 322 may be attached to the decoration bracket 321 by a glue connection. In such cases, when the user alters the decoration effect of the decoration member 32, the decoration strip 322 may be altered without removing the whole decoration member 32 from the ear hook housing 31. FIG. 6 is a schematic diagram illustrating a structure of a side of a decoration bracket 321 close to the ear hook housing 31 in FIG. 4 according to some embodiments of the present disclosure. In some embodiments, as shown in FIG. 6, a second groove 3211 may be disposed on one side of the decoration bracket 321 toward the ear hook housing 31. In such cases, when the decoration bracket 321 is embedded and fixed to the first groove 315 on the decorative bracket 321, the second groove 3211 and the first groove 315 may cooperate with each other to form a wiring channel.

In some embodiments, a pit 316 may be disposed at a position of a bottom portion of the first groove 315 close to an end portion of the decoration strip 322 such that an end of the decoration strip 322 may be lifted from the first groove 315 by pressing the decoration strip 322 into the pit 316, which facilitates the replacement of the decoration strip 322. At this time, the first groove 315 may further extend to the accommodation bin 313. The pit 316 may be disposed on the accommodation bin 313. The pit 316 may be located outside a region where the decoration bracket 321 covers the first groove 315. The decoration strip 322 may be fitted and fixed to the decoration bracket 321 and cover the pit 316. At this time, an overall length of the decoration strip 322 may be larger than an overall length of the decoration bracket 321.

In some embodiments, the decoration bracket 321 and the decoration strip 322 may also be a structural member integrally formed. The material of the decoration bracket 321 may be different from the material of the decoration strip 322. The decoration bracket 321 and the decoration strip 322 may be formed by two-color injection molding such that the decoration bracket 321 may function as a support and the decoration strip 322 may function as a decoration. For example, the overall length of the decoration strip 322 may be larger than or equal to the overall length of the decoration bracket 321.

As shown in FIG. 3, the first groove 315 may be divided into a first sub-groove section 3151 located on the bending transition portion 312, a second sub-groove 3152 located on the earphone fixing portion 311, and a third sub-groove section 3153 located on the accommodation bin 313. A depth of the first sub-groove section 3151 may be larger than both a depth of the second sub-groove section 3152 and a depth of the third sub-groove section 3153. In such cases, the first sub-groove section 3151 may be configured to accommodate the decoration bracket 321 and realize the wiring. The second sub-groove section 3152 and the third sub-groove section 3153 may be configured to accommodate the decoration strip 322. In other words, the decoration strip 322 may not only be located in the first sub-groove section 3151, but also extend into the second sub-groove section 3152 and the third sub-slot section 3153. At this time, the pit 316 may be disposed in the third sub-groove section 3153. Further, the depth of the second sub-groove section 3152 may be equal to the depth of the third sub-groove section 3153. After the decoration bracket 321 is embedded and fixed to the first sub-groove section 3151, a surface of the decoration bracket 321 that is away from the ear hook housing 31 may be substantially flat to a groove bottom of the second sub-groove section 3152 and a groove bottom of the third sub-groove section 3153, so that the decoration strip 322 may be flatly attached to the earphone fixing portion 311, the decoration bracket 321, and the accommodation bin 313.

In some embodiments, a bonding strength between the decoration strip 322 and the decoration bracket 321 may be less than a fixing strength between the decoration bracket 321 and the bending transition portion 312. When the decoration strip 322 is glued to the decoration bracket 321, the bonding strength may refer to a glue strength between the decoration strip 322 and the decoration bracket 321. At this time, a size of the bonding strength may depend on a roughness of a glued surface of the decoration bracket 321, a roughness of a glued surface of the decoration strip 322, and/or an amount (and/or a viscosity) of a glue between the decoration strip 322 and the decoration bracket 321. In some embodiments, when the decoration bracket 321 is clamped with the bending transition portion 312, the fixing strength may refer to a clamping strength between the decoration bracket 321 and the bending transition portion 312. At this time, the fixing strength may depend on a fit clearance between the decoration bracket 321 and the bending transition portion 312, and/or a depth of the clamping between the decoration bracket 321 and the bending transition portion 312. In such cases, when the decoration bracket 321 and the ear hook housing 31 are assembled by a clamping connection, two ends of the decoration strip 322 may be further glued with the accommodation bin 313 and the earphone fixing portion 311, respectively, to further fix the decoration bracket 321. When the decoration bracket 321 is replaced to change the decoration effect of the decoration member 32, the decoration bracket 321 may not be brought by the excessive bonding strength between the decoration bracket 321 and the decoration strips 322.

In some embodiments, when the accommodation bin 313 shown in FIG. 2 is configured to accommodate the main circuit board 50, the accommodation bin 313 shown in FIG. 4 may be configured to accommodate the battery 60. At this time, if the ear hook assembly 30 shown in FIG. 2 corresponds to a left ear hook of the bone conduction earphone 10, the ear hook assembly 30 shown in FIG. 4 may correspond to a right ear hook of the bone conduction earphone 10. Alternatively, if the ear hook assembly 30 shown in FIG. 2 corresponds to the right ear hook of the bone conduction earphone 10, the ear hook assembly 30 shown in FIG. 4 may correspond to the left ear hook of the bone conduction earphone 10. In other words, the main control circuit board 50 and the battery 60 may be disposed in two ear hook assemblies 30, respectively. In such cases, a capacity of the battery 60 may be increased to improve a battery life of the bone conduction earphone 10. A weight of the bone conduction earphone 10 may be balanced to improve the wearing comfort of the bone conduction earphone 10. At this time, the main control circuit board 50 and the battery 60 may be connected to the wires of the rear hook assembly 40, and the specific configuration will be described in detail later. In some embodiments, the left ear hook (or right ear hook) and/or the rear hook assembly 40 may be omitted, the bone conduction earphone 10 may include one ear hook, and the accommodation bin 313 of the ear hook may simultaneously accommodate the main control circuit board 50 and battery 60.

As shown in FIG. 4, the ear hook assembly 30 may further include a button 36. A button adaptation hole 317 may be disposed on the ear hook housing 31. The decoration bracket 321 may be fixed on one side of the ear hook housing 31. The button 36 may be disposed on the other side of the ear hook housing 31 that is away from the decoration bracket 321, and exposed through the button adaptation hole 317. The decoration bracket 321 may further extend to a top of the button 36 in a form of a cantilever and may be able to trigger the button 36 when pressed by an external force. The button 36 may be exposed through the button adaptation hole 317. In such cases, the button 36 may be used to replace the above control key 33 to simplify the structure of the bone conduction earphone 10. Alternatively, the button 36 may coexist with the above control key 33. The button 36 may be used to implement functions such as play/pause, artificial intelligence (AI) wake-up, etc., so as to expand an interaction of the bone conduction earphone 10.

In some embodiments, the button adaptation hole 317 may be disposed on the earphone fixing portion 311. The button 36 may be pressed on the earphone fixing portion 311 by the user. At this time, the ear hook assembly 30 may further include a sealing component 37. The sealing component 37 may be disposed between the button 36 and the earphone fixing portion 311. A material of the sealing component 37 may include silica gel, rubber, or the like, or any combination thereof. In such cases, a waterproof performance of the earphone fixing portion 311 at a region where the button 36 is located may be increased. A pressing touch of the button 36 may also be improved.

Similarly, when the core module 20 is disposed at one end of the ear hook assembly 30 (e.g., one end where the earphone fixing portion 311 is located) and the battery 60 is disposed on the other end of the ear hook assembly 30 (e.g., the other end where the accommodation bin 313 is located), the leading wire may at least pass through the region where the bending transition section 312 is located so that the core module 20 may be connected with the battery 60 through the leading wire. To this end, as shown in FIG. 4, the first groove 315 may be disposed on at least one side of the earphone fixing portion 311 and the bending transition portion 312 close to the decoration bracket 321. The first groove 315 may be configured for wiring to reduce the difficulty of disposing of the leading wire in the ear hook housing 31. Further, one end of the first groove 315 may be in communication with the button adaptation hole 317. When the decoration bracket 321 is embedded and fixed to the first groove 315, the decoration bracket 321 may also cover the button adaptation hole 317 for triggering the button 36.

Through the above manner, the decoration member 32 may be configured to decorate the ear hook housing 31, shield the leading wire, shield the button 36, and trigger the button 36, so that the decoration member 32 may achieve "one piece with four functions."

As shown in FIG. 5, the first groove 315 may be divided into the first sub-groove section 3151 located on the bending transition portion 312 and the second sub-groove section 3152 located on the earphone fixing portion 311. The depth of the first sub-groove section 3151 may be larger than the depth of the second sub-groove section 3152, so that the first sub-groove section 3151 may be configured for wiring, and the second sub-groove section 3152 and the first sub-groove section 3151 may be configured to accommodate the decoration bracket 321. For example, the button adaptation hole 317 may be disposed in the second sub-groove section 3152. That is, projections of the button adaptation hole 317 and the second sub-groove section 3152 on the earphone fixing portion 311 may be at least partially overlapped. Further, the first groove 315 may also be divided into the third sub-groove section 3153 located on the accommodation bin 313. The third sub-groove section 3153 may be also disposed with the pit 316. The depth of the second sub-groove section 3152 may be larger than the depth of the third sub-groove section 3153, so that the third sub-groove section 3153 may be configured to accommodate the decoration strip 322. In other words, the decoration strip 322 may not only be located in the first sub-groove section 3151 and the second sub-groove section 3152, but also extend into the third sub-groove section 3153. For example, after the decoration bracket 321 is embedded and fixed to the first sub-groove section 3151, a surface of the decoration bracket 321 that is away from the ear hook housing 31 may be substantially flat to the groove bottom of the third sub-groove section 3153. In such cases, the decoration strip 322 may be flatly attached to the earphone fixing portion 311, the decoration bracket 321, and the accommodation bin 313. The decoration bracket 321 may form a cantilever at a position of the second sub-groove section 3152 corresponding to the button adaptation hole 317.

As shown in FIG. 6, the decoration bracket 321 may include a fixing portion 3212 corresponding to the first sub-groove section 3151 and a pressing portion 3213 corresponding to the second sub-groove section 3152. A thickness of the fixing portion 3212 may be larger than a thickness of the pressing portion 3213, so that the fixing portion 3212 may be configured to assemble the decoration bracket 321 and the ear hook housing 31. The pressing portion 3213 may be configured to trigger the button 36. Further, when the second groove 3211 is disposed on one side of the decoration bracket 321 toward the ear hook housing 31, the second groove 3211 may be disposed on the fixing portion 3212.

Figure 7:
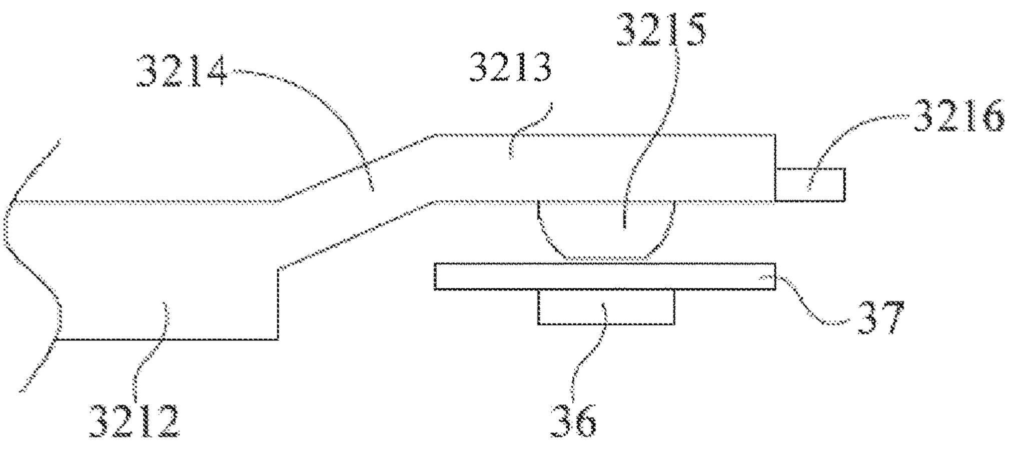
FIG. 7 is a schematic diagram illustrating triggering a button of the decoration bracket in FIG. 4 according to some embodiments of the present disclosure.

FIG. 7 is a schematic diagram illustrating triggering a button 36 of the decoration bracket 321 in FIG. 4 according to some embodiments of the present disclosure. As shown in FIG. 6 and FIG. 7, the decoration bracket 321 may include a connection portion 3214 connected between the fixing portion 3212 and the pressing portion 3213. The connection portion 3214 may be bent and extended toward a side away from the ear hook housing 31 relative to the fixing portion 3212. The pressing portion 3213 may be bent and extended toward a side close to the ear hook housing 31 relative to the fixing portion 3212. At this time, the connection portion 3214 may cause the pressing portion 3213 to be suspended relative to the fixing portion 3212. There may be a certain distance between the pressing portion 3213 and the fixing portion 3212. The distance may be larger than or equal to a trigger stroke of the button 36. In such cases, a problem that when one end of the decoration bracket 321 (e.g., one end of the pressing portion 3213) is pressed by the user, the other end of the decorative bracket 321 is lifted may be effectively solved.

In some embodiments, one side of the pressing portion 3213 close to the ear hook housing 31 may also be disposed with a button protrusion 3215. In such cases, when the pressing portion 3213 is pressed by an external force, the button protrusion 3215 may trigger the button 36. Projections of the button protrusion 3215 and the button 36 may be at least partially overlapped on the earphone fixing portion 311. A valid area of the button protrusion 3215 in contact with the button 36 may be less than a valid area of the pressing portion 3213 in contact with the button 36. In such cases, a trigger difficulty of the button 36 may be reduced. For example, when the sealing component 37 is disposed between the earphone fixing unit 311 and the button 36, the sealing component 37 may be deformed first before the button 36 is triggered. Based on a relationship equation $F \propto \varepsilon \cdot S$, in a case where a same external force F is applied by the user, if a valid area S of a region of the sealing component 37 deformed is smaller, a deformation ε generated by the sealing component 37 may be larger, which may more easily trigger the button 36. In some embodiments, the button protrusion 3215 may reduce the valid area compared to the pressing portion 3213.

In some embodiments, a blocking portion 3216 may be disposed on an end portion of the decoration bracket 321 close to the earphone fixing portion 311. The blocking portion 3216 may be configured to form a block on an inner surface of the fixing portion 311 that is away from the decoration bracket 321 to prevent the end portion of the decoration bracket 321 from being lifted from the first groove 315, for example, under an external force. As shown in FIG. 7, the blocking portion 3216 may be disposed at one end of the pressing portion 3213 away from the fixing portion 3212. At this time, due to a blocking effect between the blocking portion 3216 and the earphone fixing portion 311, after the decoration bracket 321 is deformed under the external force to trigger the button 36, the decoration bracket 321 may not be lifted due to an excessive elastic recovery.

Referring to FIG. 2 or FIG. 6, a clinch portion 3217 may be disposed on one end of the decoration bracket 321 close to the accommodation bin 313 (e.g., the other end of the decoration bracket 321 away from the pressing portion 3213). A thickness of the clinch portion 3217 may be less than the thickness of the fixing portion 3212. In such cases, the clinch portion 3217 may be configured for structural avoidance with the reinforcing structure of the ear hook housing 31 (e.g., located between the bending transition portion 312 and the accommodation bin 313).

Figure 8:
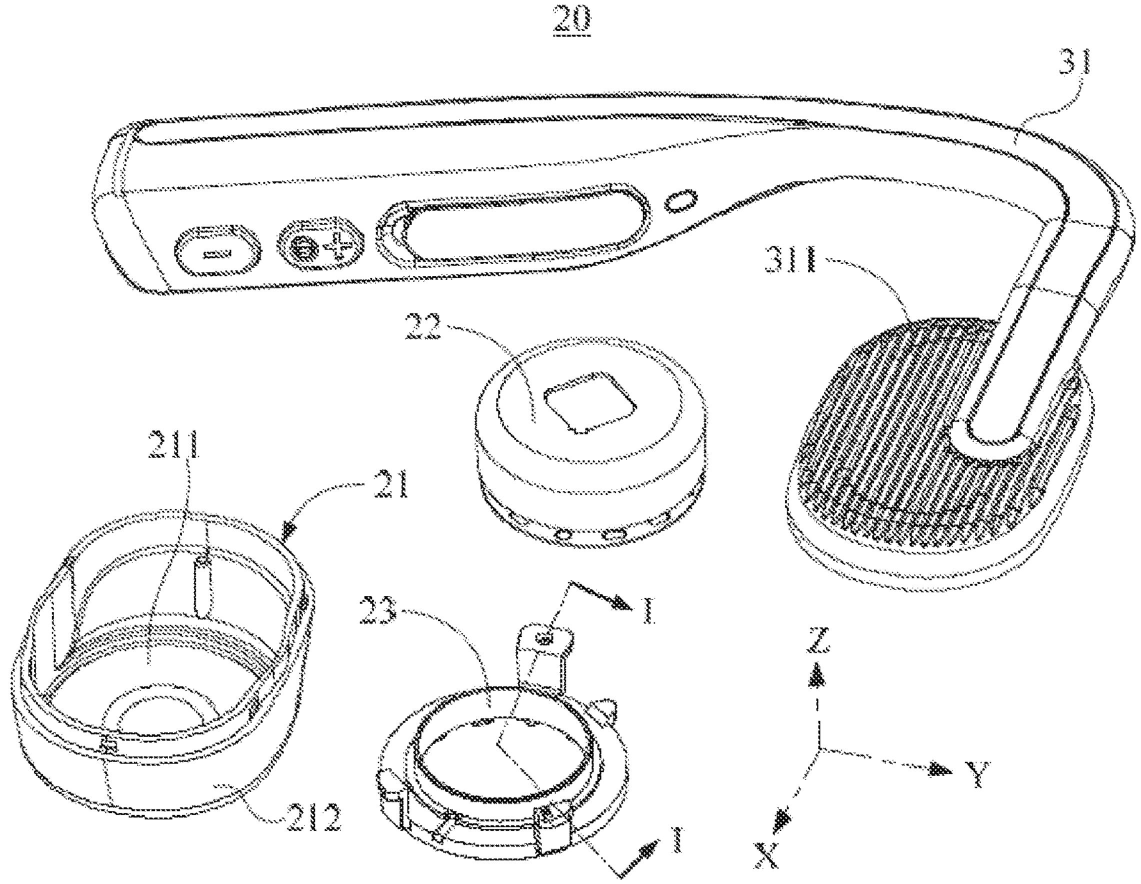
FIG. 8 is a schematic diagram illustrating a breakdown structure of the core module in FIG. 1 according to some embodiments of the present disclosure.

FIG. 8 is a schematic diagram illustrating a breakdown structure of the core module 20 in FIG. 1 according to some embodiments of the present disclosure. As shown in FIG. 8, the core module 20 may include a core housing 21 and a core 22. One end of the core housing 21 may include an opening. The ear hook housing 31 (e.g., the earphone fixing portion 311) may be disposed on an opening end of the core housing 21 (e.g., the end of the core housing 21 with the opening) to form a chamber structure for accommodating the core 22. In some embodiments, the ear hook housing 31 may be equivalent to a cover of the core housing 21. In such cases, compared to an insertion assembly of the ear hook structure and the core structure, a cover assembly of the ear hook housing 31 and the core housing 21 according to some embodiments of the present disclosure may improve a stress problem of an insertion position of the ear hook structure and the core structure, thereby increasing the reliability of the bone conduction earphone 10.

It should be noted that the ear hook housing described in FIG. 8 is for illustration of a relative position relationship between the ear hook housing and the core housing, which may further implicitly indicate a possible assembly between the ear hook housing and the core housing.

In some embodiments, the core 22 may be directly or indirectly fixed to the core housing 21, so that the core 22 may generate vibrations under an excitation of the electrical signal. The core housing 21 may be driven to vibrate with the vibrations. When the user wears the bone conduction earphone 10, the skin contact region of the core housing 21 (e.g., a bottom wall 211 described later) may be in contact with the user's skin, so that the vibrations may be transmitted to the cochlear nerve through the human skull. Furthermore, the user may hear the sound played by the bone conduction earphone 10. In some embodiments, when the user wears the earphone, one side of the core housing 21 (e.g., the bottom wall 211 described below) may face the user's head. For example, the earphone may also include an air conduction earphone. One or more sound guiding holes may be provided on one side of the air conduction earphone, and when the user wears the air conduction earphone, the side with the one or more sound guiding holes may face the user's ear canal. The sound signal generated by the earphone may be transmitted to the user by means of air conduction. Alternatively or additionally, the one or more sound guiding holes may be arranged on different side walls of the earphone, so as to achieve different sound transmission effects. For example, a first sound guiding hole may be provided on a bottom wall of the earphone facing the user's head, and the first sound guiding hole may be used to transmit a first sound signal to the user's ear canal. A second sound guiding hole may be provided on other side walls different from the bottom wall, and the second sound guiding hole may be used to transmit a second sound signal. The second sound signal may be superimposed with a leaked sound wave generated by the vibration of the core housing 21, so as to achieve the effect of reducing the sound leakage of the core housing 21. In some embodiments, the core module 20 may further include a core bracket 23. The core bracket 23 may be configured to fix the core 22 in the core housing 21.

A low frequency may refer to a sound with a frequency less than 500 Hz. A medium frequency may refer to a sound with a frequency within a range from 500 to 4000 Hz. A high frequency may refer to a sound with a frequency greater than 4000 Hz. FIG. 9 is a schematic diagram illustrating a frequency response curve of a bone conduction earphone according to some embodiments of the present disclosure. As shown in FIG. 9, a horizontal axis may represent a frequency of vibrations. A unit of the horizontal axis may be hertz (Hz). A longitudinal axis may represent an intensity of the vibrations. A unit of the longitudinal axis may be decibel (dB). A high frequency region (e.g., a range greater than 4000 Hz) may include a first high frequency valley V, a first high frequency peak P1, and a second high frequency peak P2. The first high frequency valley V and the first high frequency peak P1 may be generated by a deformation of a non-skin contact region of the core housing 21 (e.g., an annular peripheral wall 212 described below) under the high frequency. The second high frequency peak P2 may be generated by a deformation of a skin contact region of the core housing 21. A frequency response curve in a frequency range from 500 to 6000 Hz may be critical to the bone conduction earphone. In the frequency range, sharp peaks or valleys are not expected. The flatter the frequency response curve, the better the sound quality of the bone conduction earphone. The larger the rigidity of a structure (e.g., the core housing 21), the less the structure deformation generated under a force, and a resonance with a higher frequency may be generated. Therefore, the first high frequency valley V, the first high frequency peak P1, and the second high frequency peak P2 may be moved toward a region with a higher frequency by increasing the rigidity of the core housing 21. In other words, in order to obtain a better quality of the sound, the rigidity of the core housing 21 may be as large as possible. To this end, in some embodiments, a material of the core housing 21 may include a mixture of at least one material such as polycarbonate, polyamide, acrylonitrile-butadiene-styrene copolymer, etc., and glass fibers and/or carbon fibers. In some embodiments, the material of the core housing 21 may include a mixture of the carbon fibers and polycarbonate in a certain proportion, a mixture of the glass fibers and polycarbonate in another proportion, or a mixture of the glass fibers and the polyamide in yet another proportion. In some embodiments, the material of the core housing 21 may include a mixture of the carbon fibers, the glass fibers, and polycarbonate in a certain proportion. After different proportions of the carbon fibers and/or glass fibers are added, elastic moduli of the materials may be different, which may also result in different rigidities of the core housing 21. For example, 20% to 50% of glass fibers may be added to polycarbonate. An elastic modulus of the material may be 6 to 8 GPa.

Based on the detailed description, on the one hand, the ear hook housing 31 (e.g., the earphone fixing portion 311) may be a portion of the core module 20 to form a chamber structure for accommodating the core 22. On the other hand, in some embodiments, in order to improve the wearing comfort of the bone conduction earphone, the ear hook housing 31 may select a soft material so that the rigidity of the ear hook housing 31 may be reduced. In such cases, when the ear hook housing 31 is covered on the core housing 21 to form the chamber structure for accommodating the core 22, since the rigidity of the ear hook housing 31 (e.g., the earphone fixing portion 311) is less than the rigidity of the core housing 21, the bone conduction earphone may easily leak the sound, which may further affect the favorability of the user.

In some embodiments, a resonant frequency of a structure may be related to the rigidity of the structure. Under a same mass, the larger the rigidity of the structure, the higher the resonant frequency. The rigidity K of the structure may be related to a material (e.g., an elastic modulus), a structure form, etc., of the structure. In some embodiments, the larger the elastic modulus E of the material, the larger the rigidity K of the structure. The larger the thickness t of the structure, the larger the rigidity K of the structure. The less the area S of the structure, the greater the rigidity K of the structure. At this time, the above relationship may be simply described using the relationship equation $K \propto (E \cdot t)/S$. In such cases, increasing the elastic modulus E of the material, increasing the thickness t of the material, reducing the area S of the structure, or the like, or any combination thereof, may increase the rigidity K of the structure, which may further increase the resonance frequency of the structure.

In some embodiments, the ear hook housing 31 may be made of a soft material (e.g., a material having a small elastic modulus, such as polycarbonate, polyamide, etc., the elastic modulus may be in a range of 2 to 3 GPa). The core housing 21 may be made of a hard material (e.g., a material having a large elastic modulus, such as polycarbonate including 20% to 50% of glass fibers, etc., the elastic modulus of the material may be in a range of 6 to 8 GPa). Due to the difference in the elastic modulus, the rigidity of the ear hook housing 31 and the rigidity of the core housing 21 may be inconsistent, which may easily result in sound leakage. Further, after the ear hook housing 31 is connected with the core housing 21, since the rigidity of the ear hook housing 31 is different with the rigidity of the core housing 21, the structure may easily generate resonance in a relatively low frequency. To this end, in some embodiments, when the elastic modulus of the core housing 21 is larger than the elastic modulus of the ear hook housing 31, the earphone fixing portion 311 may be disposed with a reinforcing structure 318 such that a ratio of a difference between a rigidity K1 of a skin contact region of the core housing 21 and a rigidity K2 of the earphone fixing portion 311 to the rigidity K1 of the skin contact region of the core housing 21 tis less than or equal to a first preset ratio threshold. In some embodiments, the first preset ratio threshold may be 10%. That is, $(K1-K2)/K1 \leq 10\%$, or $K2/K1 \geq 90\%$. In such cases, the core housing 21 may have sufficient rigidity such that the resonance frequency of the core housing 21 may be located in a high frequency region as high as possible, and a rigidity difference between the earphone fixing portion 311 and the core housing 21 may be reduced such that the resonance frequency of the structure may be increased and the above-mentioned sound leakage may be improved.

FIG. 10A and FIG. 10B are schematic diagrams illustrating cross-sectional views of a reinforcing structure disposed on the ear hook housing in FIG. 8 according to some embodiments of the present disclosure. In some embodiments, as shown in FIG. 10A and FIG. 10B, the core housing 21 may include the bottom wall 211 and the annular peripheral wall 212. In some embodiments, the bottom wall 211 may be the skin contact region of the core housing 21. One end of the annular peripheral wall 212 may be integrally connected with the bottom wall 211. In other words, the bottom wall 211 may be in contact with the user's skin or face the user's head (e.g., face the user's ear canal). In some embodiments, the earphone fixing portion 311 may include a fixing body 3111 connected with the bending transition portion 312 and an annular flange 3112 integrally connected with the fixing body 3111 and extending toward the core housing 21. The annular flange 3112 and the other end of the annular peripheral wall 212 away from the bottom wall 211 may be connected with each other. The annular flange 3112 and the other end of the annular peripheral wall 212 may be connected by a glue connection or a combination of the glue connection and a clamping connection.

It should be noted that, a shape of the bottom wall 211 may include a rectangle, a square, a circle, an ellipse, an oval-like shape (similar to the shape of the earphone fixing portion 311 shown in FIGS. 11A-11D), or the like, or any combination thereof. In some embodiments, the annular peripheral wall 212 may be perpendicular to the bottom wall 211. That is, an area of the opening end of the core housing 21 may be equal to an area of the bottom wall 211. In some embodiments, the annular peripheral wall 212 may be inclined outward relative to the bottom wall 211 (e.g., an inclination angle is less than or equal to 30 degrees). That is, the area of the opening end of the core housing 21 may be larger than the area of the bottom wall 211. In this embodiment, the bottom wall 211 may be an oval-like shape, and the annular peripheral wall 212 may be inclined 10 degrees outward relative to the bottom wall 211. In such cases, under the premise of ensuring a certain wearing comfort (because the bottom wall 211 as the skin contact region of the core housing 21 is in contact with the user's skin, the region may not too small), the area of the bottom wall 211 may be reduced. The resonance frequency of the core housing 21 may be increased.

As shown in FIG. 10A, the reinforcing structure 318 may be an arcuate structure disposed between the fixing body 3111 and the annular flange 3112. That is, the reinforcing structure 318 may be performed by a fillet process. In some embodiments, since a size of the annular flange 3112 in a thickness direction of the earphone fixing portion 311 is small, the annular flange 3112 may be integrated with the above arcuate structure. At this time, for the earphone fixing portion 311, the structure of the earphone fixing portion 311 may include the fixing body 3111 and the reinforcing structure 318 with the arcuate structure. In such cases, the above arcuate structure may be configured to reduce the valid area of the earphone fixing portion 311 and increase the rigidity of the earphone fixing portion 311, thereby reducing the difference between the rigidity of the earphone fixing portion 311 and the rigidity of the core housing 21. It should be noted that the size of the arcuate structure may be reasonably designed according to rigidity requirements of the earphone fixing portion 311, which may not be limited herein.

As shown in FIG. 10B, the reinforcing structure 318 may be a thickened layer integrally disposed with the fixing body 3111. That is, the reinforcing structure 318 may be performed by a thickening process. A material of the thickened layer may be the same as the material of the ear hook housing 31. For example, the material of the thickened layer may further include polycarbonate, polyamide, an acrylonitrile-butadiene-styrene copolymer. It should be noted that the reinforcing structure 318 may be located on one side of the fixing body 3111 close to the core housing 21. Alternatively, the reinforcing structure 318 may be located on the other side of the core housing 21 that is away from the fixing body 3111. In some embodiments, the reinforcing structure 318 may also be located on both sides of the fixing body 3111. In some embodiments, since the size of the annular flange 3112 in the thickness direction of the earphone fixing portion 311 is small, the annular flange 3112 may be integrated with the above thickened structure. At this time, the earphone fixing portion 311 may include the fixing main body 3111 and the reinforcing structure 318 disposed with the thickened layer. In such cases, the above thickened structure may be configured to reduce the valid area of the earphone fixing portion 311 and increase the rigidity of the earphone fixing portion 311, thereby reducing the difference between the rigidity of the earphone fixing portion 311 and the rigidity of the core housing 21. It should be noted that the size of the thickened layer may be reasonably designed according to the rigidity requirements of the earphone fixing portion 311, which may not be limited herein.

In some embodiments, the reinforcing structure 318 may include a metal piece. The material of the metal piece may include aluminum alloys, magnesium alloys, titanium alloys, nickel alloys, chromium molybdenum steel, stainless steel, or the like, or any combination thereof. At this time, the reinforcing structure 318 and the earphone fixing portion 311 may be a structure piece formed by metal insert injection molding. Therefore, the metal piece may effectively increase the rigidity of the earphone fixing portion 311, thereby reducing the difference between the rigidity of the earphone fixing portion 311 and the core housing 21. It should be noted that parameters (e.g., a material, a size, etc.) of the reinforcing structure 318 may be reasonably designed according to the rigidity requirements of the earphone fixing portion 311, which may not be limited herein.

Figure 11A:
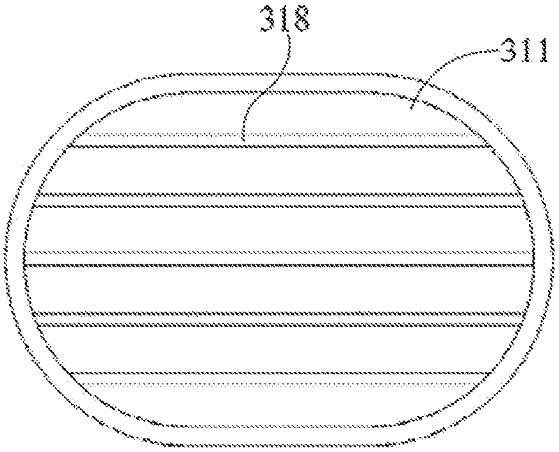
FIGS. 11A-11D are schematic diagrams illustrating top views of a reinforcing structure disposed on the ear hook housing in FIG. 8 according to some embodiments of the present disclosure.
Figure 11B:
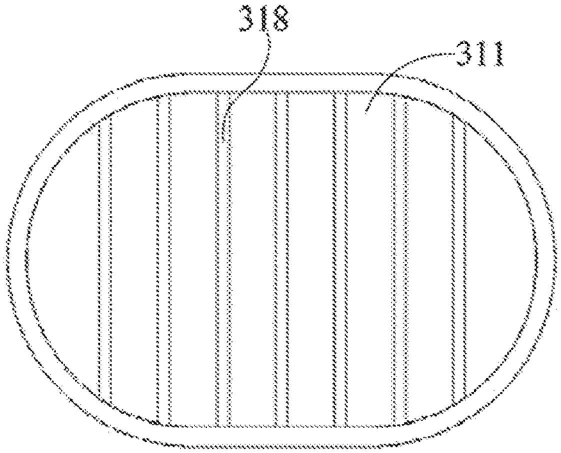
Figure 11C:
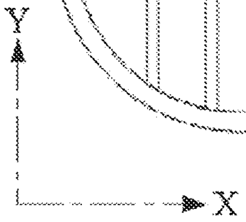
Figure 11C:
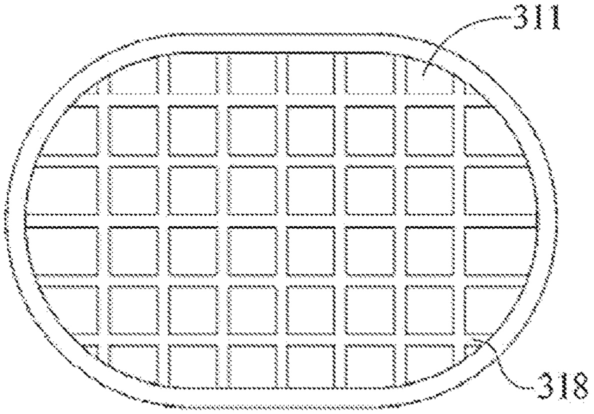
Figure 11D:
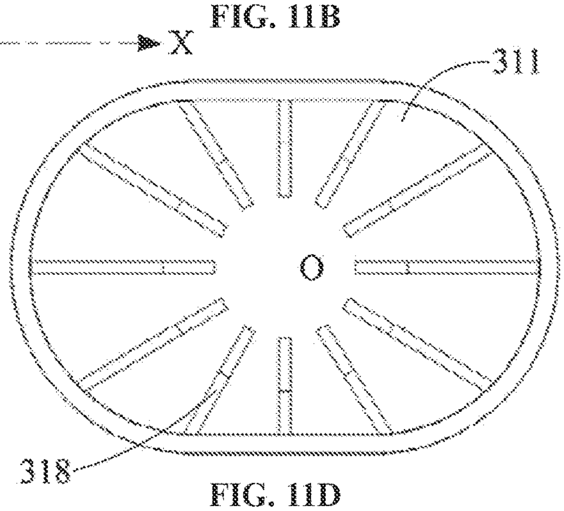

FIGS. 11A-11D are schematic diagrams illustrating top views of a reinforcing structure 318 disposed on the ear hook housing 31 in FIG. 8 according to some embodiments of the present disclosure. In some embodiments, as shown in FIGS. 11A-11D, the reinforcing structure 318 may include a reinforcing rib disposed on the earphone fixing portion 311. The reinforcing rib may be distributed on one side of the earphone fixing portion 311 close to the core housing 21. In some embodiments, the reinforcing structure 318 may include a plurality of reinforcing ribs. In some embodiments, the plurality of reinforcing ribs may be disposed in parallel as shown in FIG. 11A and FIG. 11B or disposed to form a grid pattern as shown in FIG. 11C. In some embodiments, the plurality of reinforcing ribs may also be disposed in a radial shape as shown in FIG. 11D with a preset reference point on the earphone fixing portion 311 as a center. In some embodiments, a material of the reinforcing rib may be the same as the material of the ear hook housing 31. For example, the material of the reinforcing rib may also include at least one of polycarbonate, polyamide, an acrylonitrile-butadiene-styrene copolymer. In such cases, compared with injection molding of the metal piece on the earphone fixing part 311 or directly thickening the earphone fixing part 311, the reinforcing ribs disposed on the earphone fixing portion 311 may increase the rigidity of the earphone fixing portion 311 and balance the weight of the earphone fixing portion 311.

In some embodiments, as shown in FIGS. 11A-11D, the earphone fixing portion 311 may include a long axis direction (e.g., a direction indicated by a dotted line X in FIGS. 11A-11D) and a short axis direction (e.g., a direction indicated by a dotted line Y in FIGS. 11A-11D). A size of the earphone fixing portion 311 along the long axis direction may be larger than a size of the earphone fixing portion 311 along the short axis direction. The following is an exemplary description of the distribution of the reinforcing ribs.

As shown in FIG. 11A, a plurality of reinforcing ribs may be strip-shaped and extend along the long axis direction to be disposed side by side along the short axis direction. At this time, the reinforcing structure 318 may be simplified as adding reinforcing ribs on a long-side of the earphone fixing portion 311.

As shown in FIG. 11B, a plurality of reinforcing ribs may be strip-shaped and extend along the short axis direction to be disposed side by side along the long axis direction. At this time, the reinforcing structure 318 may be simplified as adding reinforcing ribs on a short-side of the earphone fixing portion 311.

As shown in FIG. 11C, a plurality of reinforcing ribs may be disposed along the long axis direction and the short axis direction, respectively, to form a grid pattern. At this time, the reinforcing structure 318 may be simplified as adding reinforcing ribs on a cross of the earphone fixing portion 311.

As shown in FIG. 11D, ends of a plurality of reinforcing ribs close to each other may be disposed at intervals. Extension lines of the plurality of reinforcing ribs may intersect at the preset reference point (as shown by a solid point O in FIG. 11D). At this time, the reinforcing structure 318 may be simplified as adding reinforcing ribs on a radiational direction of the earphone fixing portion 311.

In some embodiments, when a preset size relationship is satisfied between the reinforcing rib and the earphone fixing portion 311, the rigidity of the earphone fixing portion 311 may be effectively increased, and the weight of the earphone fixing portion 311 may be balanced. In some embodiments, a ratio of a thickness of the reinforcing rib to a thickness of the earphone fixing portion 311 may be in a first ratio range. For example, the first ratio range may be 0.8-1.2. In some embodiments, a ratio of a width of the reinforcing rib to the thickness of the earphone fixing portion 311 may be in a second ratio range. For example, the second ratio range may be 0.4-0.6. In some embodiments, a ratio of an interval between two adjacent reinforcing ribs to the thickness of the earphone fixing portion 311 may be in a third ratio range. For example, the third ratio range may be 1.6-2.4. In some embodiments, the thickness of the reinforcing rib may be the same as the thickness of the earphone fixing portion 311, the width of the reinforcing rib may be half of the thickness of the earphone fixing portion 311, and the interval between two adjacent reinforcing ribs may be twice the thickness of the earphone fixing portion 311. Merely by way of example, in this embodiment, the thickness of the earphone fixing portion 311 may be 0.8 millimeters, and the thickness, width of the reinforcing rib, and the interval between two adjacent reinforcing ribs may be 0.8 millimeters, 0.4 millimeters, and 1.6 millimeters, respectively.

It should be noted that the various reinforcing structures shown in FIG. 10A, FIG. 10B, and FIGS. 11A-11D may be reasonably assembled based on the rigidity requirements of the earphone fixing portion 311, which may not be limited herein.

Figure 12:
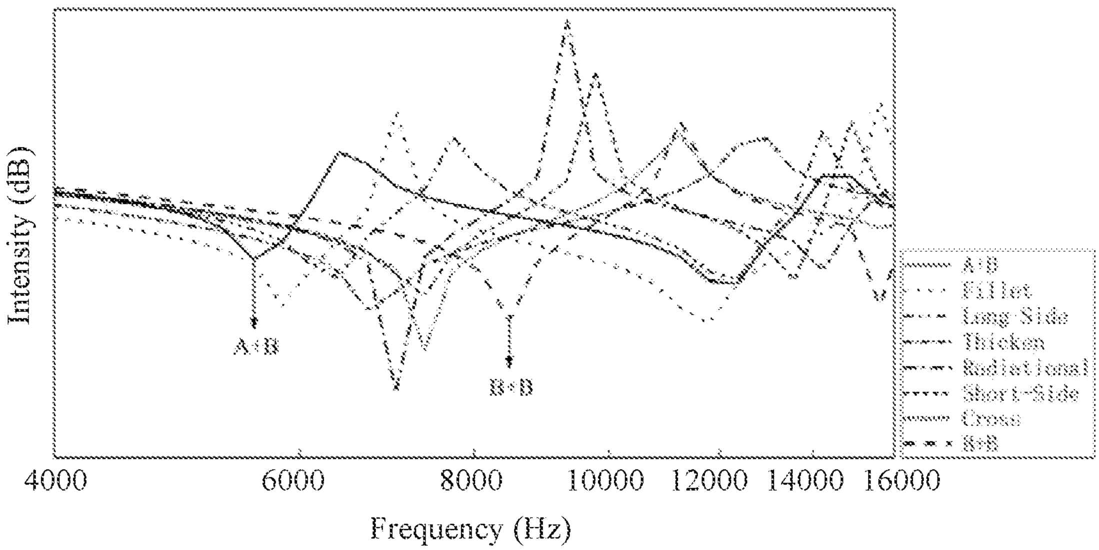
FIG. 12 is a schematic diagram illustrating frequency response curves corresponding to a plurality of reinforcing structures in FIGS. 10A-10B and FIGS. 11A-11D according to some embodiments of the present disclosure.

FIG. 12 is a schematic diagram illustrating frequency response curves corresponding to a plurality of reinforcing structures 318 in FIGS. 10A-10B and FIGS. 11A-11D according to some embodiments of the present disclosure. As shown in FIG. 12, the curve (A+B) may indicate a frequency response curve of the earphone when the material of the earphone fixing portion 311 is different from the material of the core housing 21 (e.g., the elastic modulus of the earphone fixing portion 311 is less than the elastic modulus of the core housing 21) and there is no improvement of the structure of the earphones fixing portion 311. The curve (B+B) may indicate a frequency response curve of the earphone when the material of the earphone fixing portion 311 is the same as the material of the core housing 21 (e.g., the elastic modulus of the earphone fixing portion 311 is the same as the elastic modulus of the core housing 21) and the earphone fixing portion 311 is similar to the structure of the core housing 21 (e.g., the thickness of the earphone fixing portion 311 equals the thickness of the core housing 21, and the area of the earphone fixing portion 311 equals the area of the bottom wall 211). A may correspond to the earphone fixing portions 311. B may correspond to the bottom wall 211 (e.g., the skin contact region of the core housing 21). (A+B) and (B+B) may correspond to the ear hook housing 31 (e.g., the earphone fixing portion 311) disposed on the core housing 21.

As shown in FIG. 12, for the structure (A+B), a resonant valley (corresponding to the first high frequency valley V) corresponding to the structure (A+B) appears at a frequency of about 5500 Hz. For the structure (B+B), a resonant valley (corresponding to the first high frequency valley V) corresponding to the structure (B+B) appears at a frequency of about 8400 Hz. If the structure (A+B) is improved to the structure (B+B), the resonant frequency of the structure may be effectively increased.

Further, for the structure (A+B), after the earphone fixing portion 311 is disposed with the reinforcing structure 318 such as a fillet as shown in FIG. 10A, a thicken as shown in FIG. 10B, a long-side as shown in FIG. 11A, a short-side as shown in FIG. 11B, a cross as shown in FIG. 11C, and a radiational shape as shown in FIG. 11D, the resonance valley of (A+B+the reinforcing structure) may appear in a frequency range of 5500 to 8400 Hz. In other words, the reinforcing structure 318 disposed on the earphone fixing portion 311 may increase the resonance frequency. That is, the reinforcing structure 318 may reduce the difference between the rigidity of the earphone fixing portion 311 and the rigidity of the core housing 21, thereby reducing the above sound leakage. It should be noted that if the structures of the reinforcing structures 318 are different, the increasing of the resonant frequency may be different. That is, degrees of improvement of the sound leakage corresponding to different structures of the reinforcing structure 318 may be different. Merely by way of example, if the increase effects of the reinforcing structure 318 on the resonant frequency is sorted from extreme excellent to relatively optimal, the order may be the cross, the short-side, the radiational shape, the thicken, the long-side, and the fillet.

Based on the above detailed description, the core 22 may generate the vibrations under the excitation of the electrical signals. The core housing 21 may be vibrated with the vibrations. When the user wears the bone conduction earphone 10, the bottom wall 211 of the core housing 21 (e.g., the skin contact region) may be in contact with the user's skin, so that the above vibrations may be transmitted to the cochlear nerve through the human skull, which may cause the user to hear the sound played by the bone conduction earphone 10. At this time, in order to ensure the reliability of the transmission of the vibrations, the core housing 21 may at least be vibrated with the core 22. Therefore, the core 22 may be fixed in the core housing 21.

Figure 13:
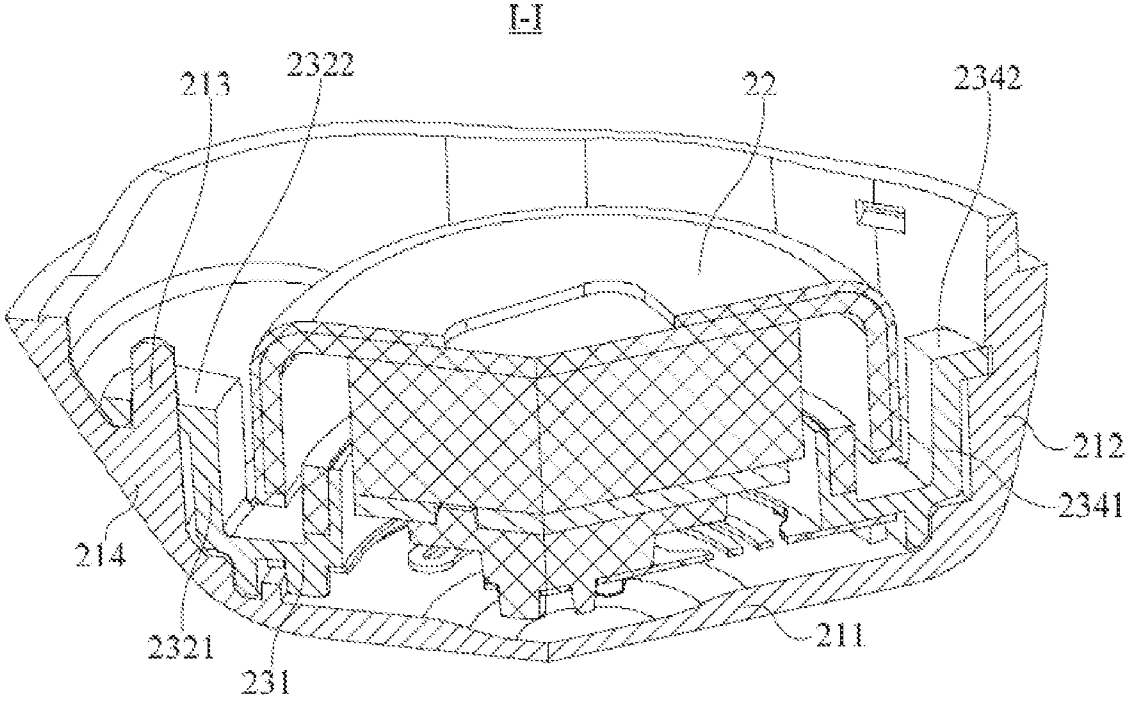
FIG. 13 is a schematic diagram illustrating a cross-sectional structure of the core module in FIG. 8 along a direction I-I after the core module being assembled according to some embodiments of the present disclosure.
Figure 14:
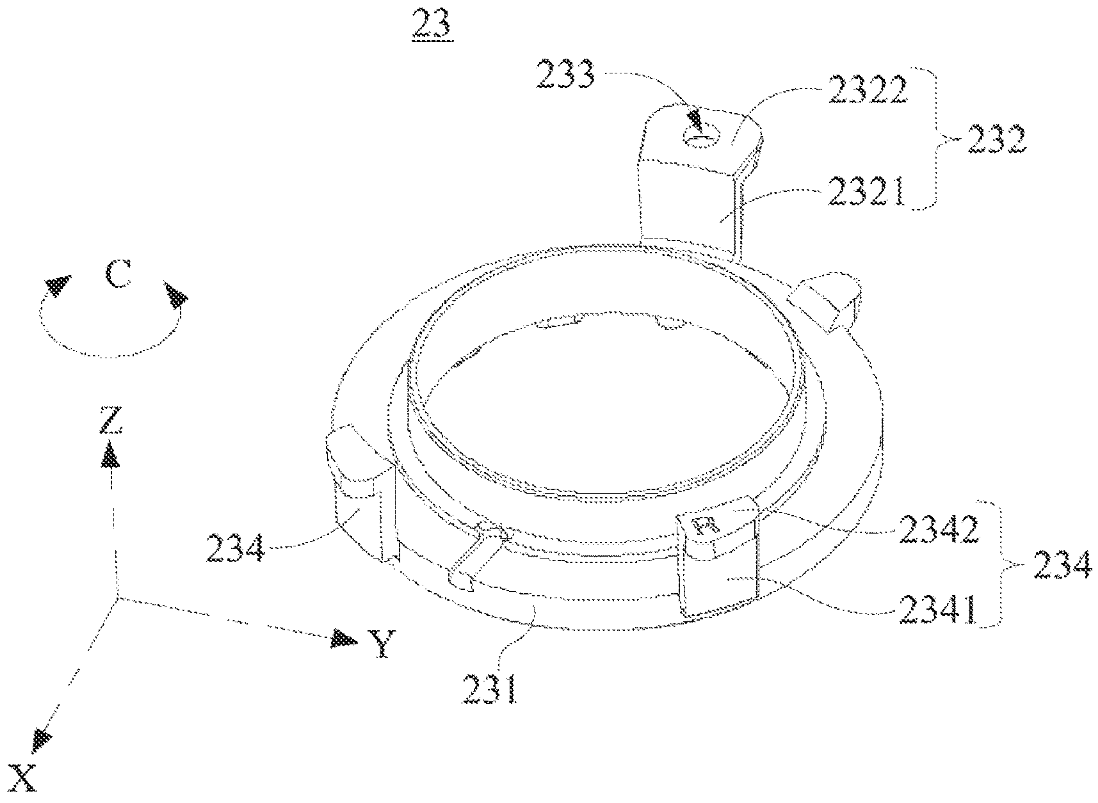
FIG. 14 is a schematic diagram illustrating a structure of the core bracket in FIG. 8 according to some embodiments of the present disclosure.

FIG. 13 is a schematic diagram illustrating a cross-sectional structure of the core module in FIG. 8 along an I-I direction after the core module being assembled according to some embodiments of the present disclosure. As shown in FIG. 13 and FIG. 8, one end of the core housing 21 may include an opening. The core bracket 23 and the core 22 may be accommodated in the core housing 21. The core bracket 23 may be configured to fix the core 22 in the core housing 21. FIG. 14 is a schematic diagram illustrating a structure of the core bracket in FIG. 8 according to some embodiments of the present disclosure. In some embodiments, as shown in FIG. 14, the core bracket 23 may include an annular bracket body 231 and a limiting structure disposed on the bracket body 231. The core 22 may be hung on the bracket body 231 to be fixedly connected with the core housing 21. As shown in FIG. 13, the limiting structure and the core housing 21 may be in an interference fit, so that the core bracket 23 may be relatively fixed with the core housing 21 along a circumferential direction (e.g., the direction denoted by arrow C as shown in FIG. 14) of the bracket body 231. A plane where the bracket body 231 is located may be parallel to a plane of the bottom wall 211 to increase the fit between the bracket body 231 and the bottom wall 211, thereby increasing a transmission effect of the vibrations. At this time, a glue (not shown in FIG. 13), such as a structural glue, a hot melt glue, an instant glue, etc., may be disposed between the bracket body 231 and the bottom wall 211. In such cases, the core bracket 23 and the core housing 21 may be assembled by the glue connection and the clamping connection, which may effectively restrict a degree of freedom between the core bracket 23 and the core housing 21. In some embodiments, the core bracket 23 and the core housing 21 may be fixed directly through the glue connection. For example, a glue (not shown in FIG. 13), such as a structural glue, a hot melt glue, an instant glue, etc., may be disposed between the bracket body 231 and the bottom wall 211, which may effectively restrict the degree of freedom between the core bracket 23 and the core housing 21. The structure of the core housing 21 may also be simplified.

As shown in FIG. 13, the core housing 21 may further include a positioning pillar 213 connected with the bottom wall 211 or the annular peripheral wall 212. As shown in FIG. 14, the limiting structure may include a first limiting structure 232. The first limiting structure 232 may be disposed with an insertion hole 233. The positioning post 213 may be inserted in the insertion hole 233. In such cases, the accuracy of assembly between the core bracket 23 and the core housing 21 may be effectively increased. For example, the above glue may be disposed between the bracket body 231 and the bottom wall 211.

In some embodiments, as shown in FIG. 14, the limiting structure may further include a second limiting structure 234. The second limiting structure 234 may be spaced apart from the first limiting structure 232 along the circumferential direction of the bracket body 231 (e.g., the direction denoted by arrow C as shown in FIG. 14). The second limiting structure 234 may be abutted with the annular peripheral wall 212, which may be described in detail later. In such cases, the second limiting structure 234 and the first limiting structure 232 may be fitted to the corresponding structures on the core housing 21, respectively, so that the core bracket 23 may be relatively fixed with the core housing 21. That is, the degree of freedom between the core bracket 23 and the core housing 21 may be effectively limited.

Figure 15:
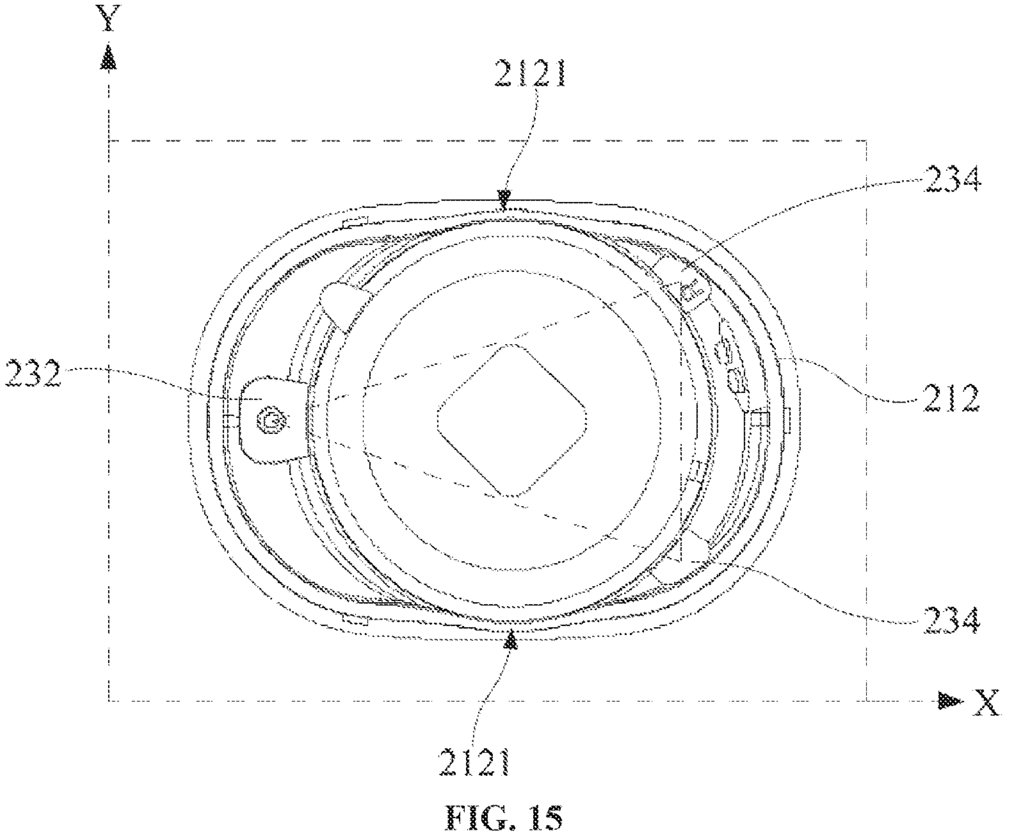
FIG. 15 is a schematic diagram illustrating a top view of a structure of the core module in FIG. 8 after the core module being assembled according to some embodiments of the present disclosure.

As shown in FIG. 8, the opening end of the annular peripheral wall 212 may include a long axis direction (e.g., a direction indicated by a dotted line X in FIG. 8) and a short axis direction (e.g., a direction indicated by a dotted line Y in FIG. 8). A size of the opening end of the annular peripheral wall 212 in the long axis direction may be larger than the size of the opening end of the annular peripheral wall 212 in the short axis direction. FIG. 15 is a schematic diagram illustrating a top view of a structure of the core module in FIG. 8 after the core module being assembled according to some embodiments of the present disclosure. As shown in FIG. 15, the first limiting structure 232 and the second limiting structure 234 may be disposed on opposite sides of the bracket body 231 at intervals along the long axis direction. Projections of the first limiting structure 232 and the second limiting structure 234 on a reference plane where the opening end of the annular peripheral wall 212 is located (e.g., the plane indicated by the dashed rectangular frame in FIG. 15) may be at least partially located outside a projection of the bracket body 231 on the reference plane. In such cases, the first limiting structure 232 may cooperate with the positioning pillar 213. The second limiting structure 234 may cooperate with the annular peripheral wall 212.

As shown in FIG. 14, the first limiting structure 232 may include a first axial extension portion 2321 and a first radial extension portion 2322. The first axial extension portion 2321 may be connected with the bracket body 231 and extend toward a side where the core 22 is located along an axial direction of the bracket body 231 (e.g., a direction indicated by a dotted line Z in FIG. 14). The first radial extension portion 2322 may be connected with the first axial extension portion 2321 and extend toward an outer side of the bracket body 231 along a radial direction of the bracket body 231 (e.g., a direction of a diameter of the bracket body 231). For example, the insertion hole 233 may be disposed on the first radial extension portion 2322 as shown in FIGS. 13 to 15, so that the first limiting structure 232 may cooperate with the positioning pillar 213. Further, as shown in FIG. 14, the second limiting structure 234 may include a second axial extension portion 2341 and a second radial extension portion 2342. The second axial extension portion 2341 may be connected with the bracket body 231 and extend toward a side where the core 22 is located along an axial direction of the bracket body 231. The second radial extension portion 2342 may be connected with the second axial extension portion 2341 and extend toward the outer side of the bracket body 231 along a radial direction of the bracket body 231. In some embodiments, the second radial extension portion 2342 may be abutted with the annular peripheral wall 212. For example, as shown in FIG. 13 and FIG. 15, the second radial extension portion 2342 may be abutted with the annular peripheral wall 212 by a clamping connection, so that the second limiting structure 234 may be abutted with the annular peripheral wall 212. In such cases, as shown in FIG. 13, the core 22 may be located between the first axial extension portion 2321 and the second axial extension portion 2341.

It should be noted that, as shown in FIGS. 13 to 15, taking the core 22 as a reference, if a region between the first axial extension portion 2321 and the second axial extension portion 2341 is an inner side of the bracket body 231, a region other than the inner side may be the outer side of the bracket body 231.

Referring to FIG. 13, the annular peripheral wall 212 may further include an inclined region 214 that corresponds to the first restriction 232 and is inclined relative to the bottom wall 211. The positioning pillar 213 may be disposed on the inclined region 214. In such cases, a valid distance between the first radial extension portion 2322 and the bottom wall 211 may be reduced. That is, a height of the positioning pillar 213 may be reduced. A structural strength of the positioning pillar 213 (e.g., a root portion of the positioning pillar 213 connected with the inclined region 214) on the core housing 21 may be increased, which may avoid breaking or falling off of the positioning pillar 213 when the bone conduction earphone 10 falls or collides.

Referring to FIG. 15, two second limiting structures 234 may be disposed at intervals along the short axis direction. The projection of the first limiting structure 232 on the reference plane and the projections of the two second limiting structures 234 on the reference plane may be connected successively to form an acute triangle (e.g., the dotted triangle as shown in FIG. 15). At this time, the acute triangle may include an acute isosceles triangle, an equilateral triangle, etc. In such cases, interaction points between the core bracket 23 and the core housing 21 may be disposed as symmetrically as possible, thereby increasing the reliability of the assembly of the core bracket 23 and the core housing 21.

In some embodiments, an outer profile of the bracket body 231 may be disposed in a circular shape. The annular peripheral wall 212 may be disposed with two arcuate recesses 2121 opposite to each other along the short axis direction. The outer profile of the bracket body 231 may be embedded in two arcuate recesses 2121, respectively. In such cases, the degree of freedom between the core bracket 23 and the core housing 21 may be further limited.

Based on the above detailed description, when the elastic modulus of the core housing 21 is larger than the elastic modulus of the ear hook housing 31, the ear hook housing 31 may be connected with the core housing 21 to form the above structure (A+B). Due to the difference in the rigidity, the resonant frequency of the structure (A+B) may be lower (the curve (A+B) as shown in FIG. 12). The sound leakage may be easily generated. After the structure (A+B) is improved to the structure (B+B), the resonance frequency of the structure (the curve (A+B) as shown in FIG. 12) may be effectively increased. Based on the improvement, the correlation structure of the core module 20 may be improved according to some embodiments of the present disclosure.

Figure 16:
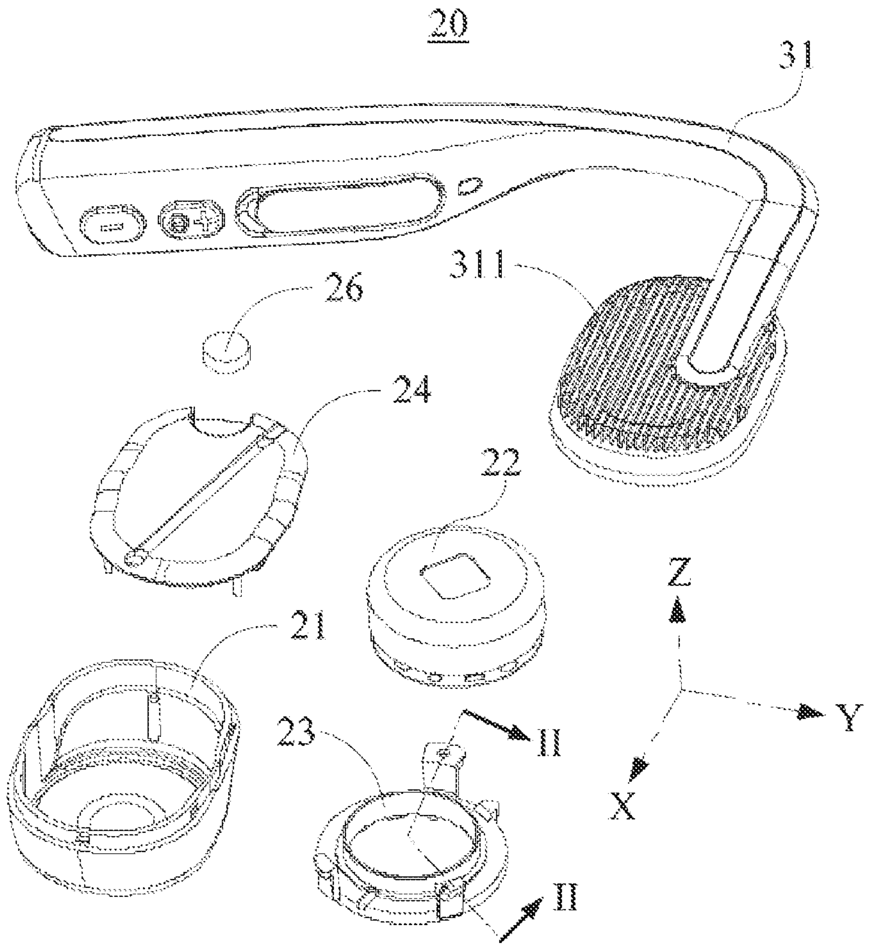
FIG. 16 is a schematic diagram illustrating a breakdown structure of the core module in FIG. 1 according to some embodiments of the present disclosure.

FIG. 16 is a schematic diagram illustrating a breakdown structure of the core module 20 in FIG. 1 according to some embodiments of the present disclosure. As shown in FIG. 16, the core module 20 may further include a cover plate 24. One end of the core housing 21 may include an opening. The cover plate 24 may be disposed on the opening end of the core housing 21 (e.g., the end of the core housing 21 with the opening) to form a chamber structure for accommodating the core 22. In other words, the cover plate 24 is covered on the other end of the annular peripheral wall 212 away from the bottom wall 211 and disposed opposite to the bottom wall 211. In some embodiments, the cover plate 24 and the core housing 21 may be connected by a glue connection or a combination of a clamping connection and the glue connection. Further, the ear hook housing 31 may be connected with the cover plate 24. For example, the earphone fixing portion 311 may cover one side of the cover plate 24 that is away from the core housing 21 in a full cover or semi-covered manner. In this embodiment, the full cover of the cover plate 24 by the earphone fixing portion 311 may be taken as an example for an exemplary description. At this time, the ear hook housing 31 and the core housing 21 may be connected by the glue connection or the combination of the clamping connection and the glue connection.

It should be noted that the ear hook housing in FIG. 16 is for the convenience of describing the relative position relationship between the ear hook housing and the cover plate, which may further implicitly indicate a possible assembly manner between the ear hook housing and the cover plate.

In some embodiments, the elastic modulus of the core housing 21 may be larger than the elastic modulus of the ear hook housing 31. The elastic modulus of the cover plate 24 may be larger than the elastic modulus of the ear hook housing 31. At this time, in this embodiment, the cover plate 24 may be connected with the core housing 21, which may increase a rigidity of the structure of the opening end of the core housing 21 (e.g., the cover plate 24 and the earphone fixing portion 311). In such cases, the difference between the rigidity of the bottom wall 211 of the core housing 21 and the rigidity of the structure of the opening end of the core housing 21 may be further reduced. The core housing 21 may have a sufficiently large rigidity to cause the resonant frequency of the core housing 21 to be located at a region with a frequency as high as possible. The resonant frequency of the structure (the core housing 21, the cover plate 24, and the earphone fixing portion 311) may be increased, thereby reducing the sound leakage.

In some embodiments, the elastic modulus of the cover plate 24 may be less than or equal to the elastic modulus of the core housing 21. For example, the elastic modulus of the cover plate 24 may be equal to the elastic modulus of the core housing 21. At this time, the cover plate 24 may be connected with the core housing 21 to form the structure (B B). In such cases, a ratio of a difference between the rigidity K1 of the bottom wall 211 and a rigidity K3 of the cover plate 24 to the rigidity K1 of the bottom wall 211 may be less than or equal to a second preset ratio threshold. In some embodiments, the second preset ratio threshold may be 10%. That is, $(K1-K3)/K1 \leq 10\%$, or $K3/K1 \geq 90\%$.

In some embodiments, the area of the bottom wall 211 may be less than or equal to the area of the cover plate 24. The thickness of the bottom wall 211 may be less than or equal to the thickness of the cover plate 24. Based on the above detailed description, under the premise of ensuring a certain wearing comfort, the area of the bottom wall 211 may be reduced. The resonance frequency of the core housing 21 may be increased. Therefore, in this embodiment, in order to ensure that the core housing includes a sufficiently large rigidity to enable a resonant frequency of the core housing to be located in a high frequency region with a frequency as high as possible, the area of the bottom wall 211 may be less than or equal to the area of the cover plate 24. For example, the area of the opening end of the core housing 21 may be larger than the area of the bottom wall 211. In some embodiments, according to the above relationship equation $K \propto (E \cdot t)/S$, when the elastic modulus of the cover plate 24 is less than or equal to the elastic modulus of the core housing 21, and the area of the bottom wall 211 is less than or equal to the area of the cover plate 24, in order to satisfy the above relationship equation $(K1-K3)/K1 \leq 10\%$, the thickness of the bottom wall 211 may be less than or equal to the thickness of the cover plate 24.

In some embodiments, the material of the cover plate 24 may be the same as the material of the core housing 21. For example, the material of the cover plate 24 and the core housing 21 may be a mixture of polycarbonate and glass fibers and/or carbon fibers. In some embodiments, according to the above relationship equation $K \propto (E \cdot t)/S$, in order to satisfy the above relationship equation $K3/K1 \geq 90\%$, a ratio of a ratio between the thickness and the area of the cover plate 24 to a ratio between the thickness and the area of the bottom wall 211 may be larger than or equal to 90%. Merely by way of example, the ratio between the thickness and the area of the cover plate 24 may be equal to the ratio between the thickness and the area of the bottom wall 211.

It should be noted that, according to the above relationship equation $K \propto (E \cdot t)/S$, in order to satisfy the above relationship equation $(K1-K3)/K1 \leq 10\%$, structural parameters (e.g., the thickness, the area, and the ratio thereof) of the cover plate 24 and the core housing 21 may be determined based on the material of the cover plate 24 and the core housing 21. Alternatively, the material of the cover plate 24 and the core housing 21 may be determined based on the structural parameters (e.g., the thickness, the area, and the ratio) of the cover plate 24 and the core housing 21. Therefore, the above embodiments only provide two possible designs as examples.

Based on the above detailed description, after the cover plate 24 is connected with the core housing 21 instead of the earphone fixing portion 311, the earphone fixing portion 311 may still be connected to one side of the core housing 21 that is away from the cover plate 24. For example, the cover plate 24 may be fully covered by the earphone fixing portion 311.

In some embodiments, if the ear hook housing 31 and the cover plate 24 are plastic members, and the elastic modulus of the ear hook housing 31 is less than the elastic modulus of the cover plate 24, the ear hook housing 31 and the cover plate 24 may be formed into an integrally structural piece by two-color injection molding. If the ear hook housing 31 is a plastic member, the cover plate 24 is a metal piece, and the elastic modulus of the ear hook housing 31 is less than the elastic modulus of the cover plate 24, the ear hook housing 31 and the cover plate 24 may be formed into an integrally structural piece by metal insert injection molding. At this time, the ear hook housing 31 and the cover plate 24 may be connected with the core housing 21 as a whole. In such cases, a consistency of the ear hook housing 31 and the cover plate 24 in the vibration may be ensured. However, the buttons mentioned above, the second microphone mentioned later, etc., may be difficult to be disposed between the ear hook housing 31 and the cover plate 24.

In some embodiments, the earphone fixing portion 311 and the cover plate 24 may be connected by a glue connection or a combination of a clamping connection and the glue connection. At this time, the buttons mentioned above, the second microphone mentioned later, etc., may be disposed between the ear hook housing 31 and the cover plate 24. More descriptions regarding the structure may be found below. In some embodiments, a filling degree of the glue (not shown in FIG. 16) between the earphone fixing portion 311 and the cover plate 24 may be as large as possible. For example, the filling degree may be larger than or equal to 90%. When the filling degree of the glue between the earphone fixing portion 311 and the cover plate 24 is small, a connection strength between the earphone fixing portion 311 and the cover plate 24 may be small. A large hysteresis of the vibration may be between the earphone fixing portion 311 and the cover plate 24. In addition, air may be between the earphone fixing portion 311 and the cover plate 24, resulting in an adverse effect on the resonance frequency of the structure. That is, the above beneficial effects of the above improvement from the structure (A+B) to the structure (B+B) may be difficult to obtain. Noise may also be generated during the vibrations of the structure.

Figure 17:
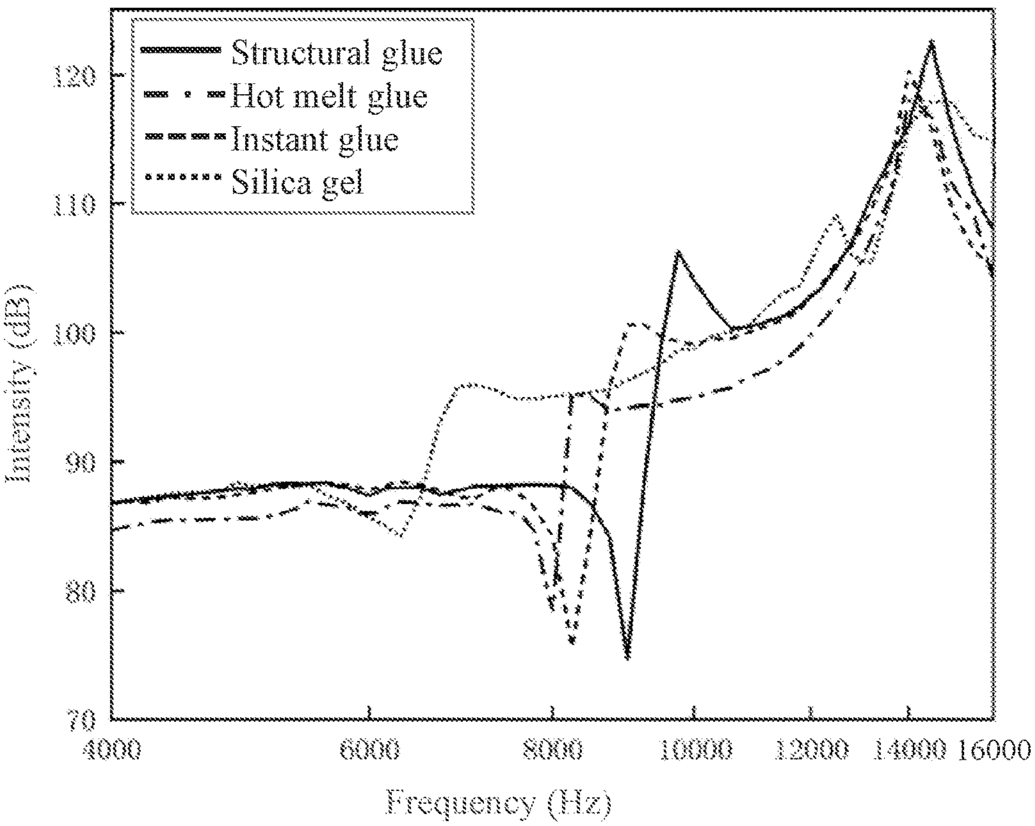
FIG. 17 is a schematic diagram illustrating frequency response curves of structures corresponding to a plurality of types of glues disposed between the ear hook assembly and the cover plate in FIG. 14 according to some embodiments of the present disclosure.

FIG. 17 is a schematic diagram illustrating frequency response curves of structures corresponding to a plurality of types of glues disposed between the ear hook assembly 30 and the cover plate 24 in FIG. 14 according to some embodiments of the present disclosure. As shown in FIG. 17, different types of glues may have an impact on the resonant frequency of the structure. If the glues are sorted according to the beneficial effects of the glues on the resonant frequency, the order may be the structural glue, the hot melt glue, the instant glue, and the silica gel. It should be noted that since the material of the silica gel is soft, the beneficial effects on the resonant frequency of the structure may be the weakest. Therefore, if the resonant frequency of the structure is considered, a glue with a high hardness may be disposed between the earphone fixing portion 311 and the cover plate 24.

Based on the above detailed description, the core bracket 23 may be configured to fix the core 22 in the core housing 21 to increase the reliability of the vibrations of the core casing 21 driven by the core 22. The cover plate 24 may be configured to increase the rigidity of the structure of the opening end of the core housing 21 (e.g., the cover plate 24 and the earphone fixing portion 311) to reduce the difference between the rigidity of the bottom wall 211 of the core housing 21 and the rigidity of the structure of the opening end of the core housing 21. The cooperation between the core bracket 23 and the core housing 21 (e.g., in the Z direction) may be implemented by a glue connection between the bracket body 231 and the bottom wall 211 and/or a clamping connection between the limiting structure and the annular peripheral wall 212. Further, in this embodiment, another cooperation between the core bracket 23 and the core housing 21 (e.g., in the Z direction) may be provided based on the cover plate 24.

Figure 18:
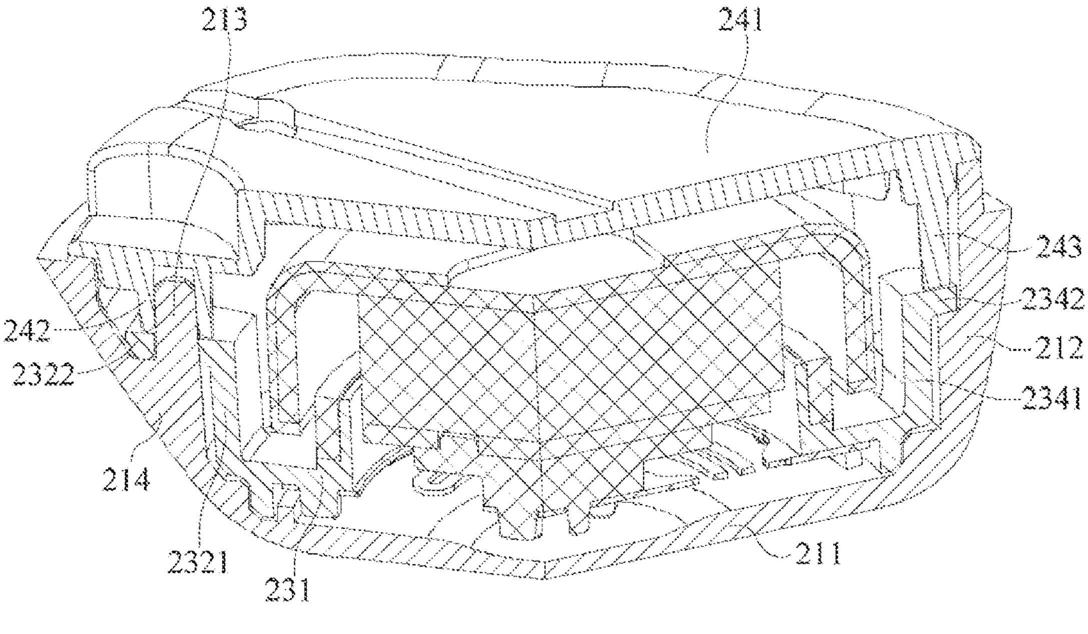
FIG. 18 is a schematic diagram illustrating a cross-sectional structure of the core module in FIG. 16 along a direction II-II after the core module being assembled according to some embodiments of the present disclosure.
Figure 19:
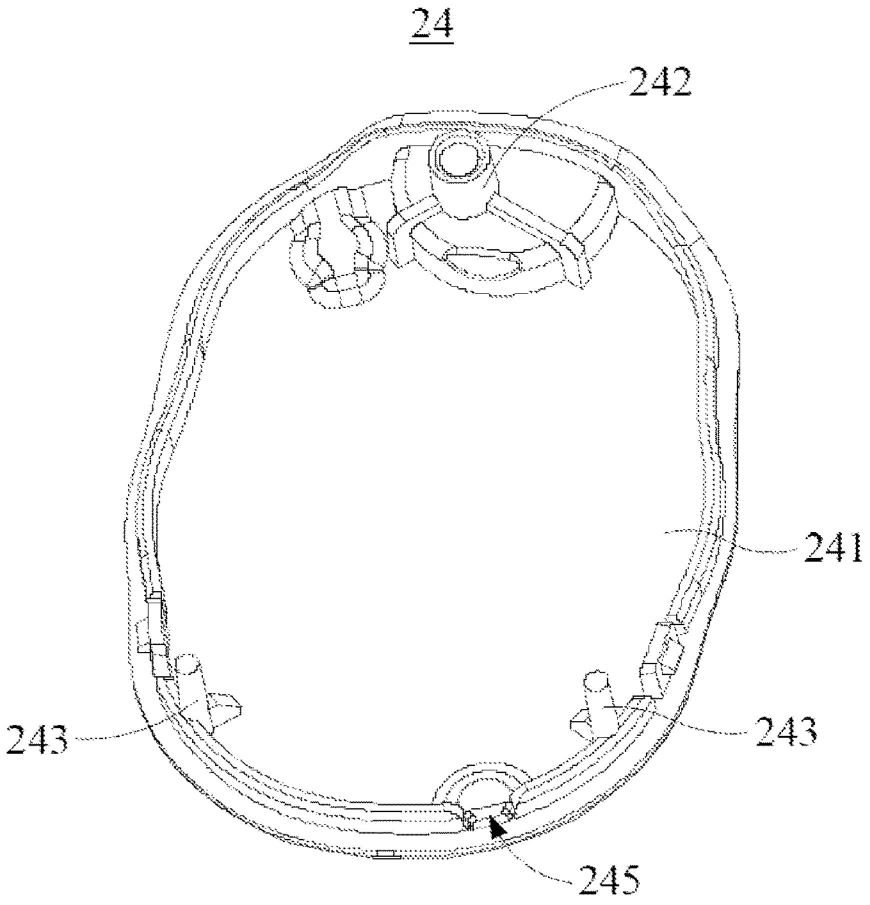
FIG. 19 is a schematic diagram illustrating a structure of one side of the cover plate close to the core housing in FIG. 16 according to some embodiments of the present disclosure.

FIG. 18 is a schematic diagram illustrating a cross-sectional structure of the core module 20 in FIG. 16 along an II-II direction after the core module being assembled according to some embodiments of the present disclosure. FIG. 19 is a schematic diagram illustrating a structure of one side of a cover plate 24 close to a core housing 21 in FIG. 16 according to some embodiments of the present disclosure. As shown in FIGS. 18 and 19, the cover plate 24 may be covered on the opening end of the core housing 21. A press structure may be disposed on one side of the cover plate 24 toward the core housing 21. The press structure may be configured to press and fix the core bracket 23 in the core housing 21. In such cases, the cover plate 24 may increase the rigidity of the structure of the opening end of the core housing 21 (e.g., the cover plate 24 and the earphone fixing portion 311). In addition, the cover plate 24 may press the core bracket 23 in the core housing 21. Further, the cover plate 24 may achieve "one piece with two functions."

As shown in FIG. 19, the cover plate 24 may include a cover plate body 241 and a press surface integrally connected with the cover plate body 241. The press structure may include a first press pillar 242 and a second press pillar 243. The first press pillar 242 and the second press pillar 243 may be disposed at intervals along the circumferential direction of the cover plate body 241, and abutted with the core bracket 23. In some embodiments, a plane where the cover plate body 241 is located may be parallel to the plane where the bottom wall 211 is located, so that the plane where the cover plate body 241 is located may be parallel to the plane where the bracket body 231 is located, which may further cause extension directions of the first press pillar 242 and the second press pillar 243 may be perpendicular to the plane where the bracket body 231 is located. That is, the extension directions of the first press pillar 242 and the second press pillar 243 may be parallel to the Z direction. In such cases, the degree of freedom between the core bracket 23 and the core housing 21 (e.g., in the Z direction) may be effectively limited.

Figure 20:
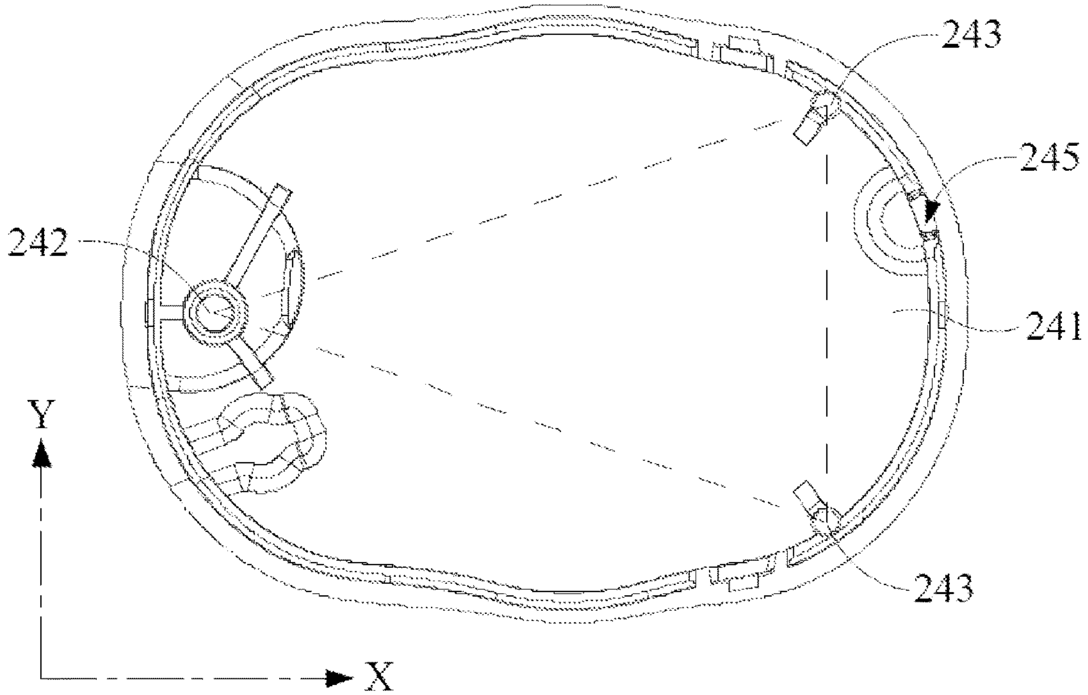
FIG. 20 is a schematic diagram illustrating a top view of the cover plate in FIG. 19 according to some embodiments of the present disclosure.

FIG. 20 is a schematic diagram illustrating a top view of the cover plate 24 in FIG. 19 according to some embodiments of the present disclosure. As shown in FIG. 20, the cover plate 24 may include a long axis direction (e.g., a direction indicated by a dotted line X in FIG. 20) and a short axis direction (e.g., a direction indicated by a dotted line Y in FIG. 20). A size of the cover plate 24 in the long axis direction may be larger than a size of the cover plate 24 in the short axis direction. At this time, the first press pillar 242 and the second press pillar 243 may be disposed at intervals along the long axis direction. In such cases, the reliability of pressing the core bracket 23 in the core housing 21 by the cover plate 24 may be increased.

In some embodiments, two second press pillars 243 may be disposed at intervals along the short axis direction. A projection of the first press pillar 242 on the cover plate body 241 and projections of the two second press pillars 243 on the cover plate body 241 may be connected sequentially to form an acute triangle (e.g., the dotted triangle as shown in FIG. 20). At this time, the acute triangle may include an acute isosceles triangle, an equilateral triangle, etc. In such cases, interaction points between the core bracket 23 and the core housing 21 may be disposed as symmetrically as possible, thereby increasing the reliability of the assembly of the core bracket 23 and the core housing 21.

Referring to FIG. 18, the first press pillar 242 may be in contact with the first limiting structure 232 to form an abutment. The second press pillar 243 may be in contact with the second limiting structure 234 to form an abutment. At this time, the second limiting structure 232 and the annular peripheral wall 212 may not form the abutment shown in FIG. 13. The processing accuracy of the second limiting structure 232 may be reduced, which may further save a production cost of the core bracket 23.

Similarly, as shown in FIG. 14, the first limiting structure 232 may include the first axial extension portion 2321 and the first radial extension portion 2322. The first axial extension portion 2321 may be connected with the bracket body 231 and extend toward the side where the core 22 is located along the axial direction (e.g., the direction indicated by the dotted line Z in FIG. 14) of the bracket body 231. The first radial extension portion 2322 may be connected with the first axial extension portion 2321 and extend toward the outer side of the bracket body 231 along the radial direction of the bracket body 231 (e.g., the direction of the diameter of the bracket body 231). At this time, the insertion hole 233 may be disposed on the first radial extension portion 2322. The first press pillar 242 may be abutted with the first radial extension portion 2322. That is, the first press pillar 242 may be pressed the first radial extension portion 2322. Further, as shown in FIG. 14, the second limiting structure 234 may include the second axial extension portion 2341 and the second radial extension portion 2342. The second axial extension portion 2341 may be connected with the bracket body 231 and extend toward the side where the core 22 is located along the axial direction of the bracket body 231. The second radial extension portion 2342 may be connected with the second axial extension portion 2341 and extend toward the outer side of the bracket body 231 along the radial direction of the bracket body 231. At this time, the second press pillar 243 may be abutted with the second radial extension portion 2342. That is, the second press pillar 243 may be abutted with the second radial extension portion 2342.

It should be noted that two second press pillars 243 may be disposed along the short axis direction. When the projection of the first press pillar 242 on the cover plate body 241 and the projections of the two second press pillars 243 on the cover plate body 241 are connected sequentially to form the acute triangle, two second limiting structures 234 may be disposed at intervals along the short axis direction, and disposed corresponding to the two second press pillars 243, respectively. In such cases, when the first press pillar 242 is abutted with the first limiting structure 232 (e.g., the first radial extension portion 2322), the two second press pillars 243 may be abutted with the second limiting structure 234 (e.g., the second radial extension portion 2342), thereby increasing the reliability of pressing the core bracket 23 in the core housing 21 by the cover plate 24.

It should be noted that, as shown in FIG. 18, since the first axial extension portion 2321 and the second axial extension portion 2341 extend in a direction close to the cover plate 24, the first press pillar 242 and the second press pillar 243 may extend in a direction close to the core 21. In such cases, heights of the first limiting structure 232 and the second limiting structure 234 relative to the bracket body 231 and heights of the first press pillar 242 and the second press pillar 243 relative to the cover plate body 241 may be half of a distance between the cover plate body 241 and the bracket body 231. In such cases, the first limiting structure 232 and the second limiting structure 234 may be prevented from being broken or falling off due to the excessive height of the first limiting structure 232 and the second limiting structure 234 relative to the bracket body 231 when the bone conduction earphone 10 falls or collides. Alternatively, the first press pillar 242 and the second press pillar 243 may be prevented from being broken or falling off due to the excessive height of the first press pillar 242 and the second press pillar 243 relative to the cover plate body 241 when the bone conduction earphone 10 falls or collides. Furthermore, structure strengths of the first limiting structure 232 and the second limiting structure 234 on the bracket body 231 and structure strengths of the first press pillar 242 and the second press pillar 243 on the cover plate body 241 may be considered.

Referring to FIG. 19, the first press pillar 242 may be disposed in a tubular shape. As shown in FIG. 18, the positioning pillar 213 may be inserted into the insertion hole 233 to increase the accuracy of assembly between the core bracket 23 and the core housing 21. The positioning pillar 213 may be further inserted into the first press pillar 242 to increase the accuracy of the assembly between the cover plate 24 and the core housing 21.

Figure 21:
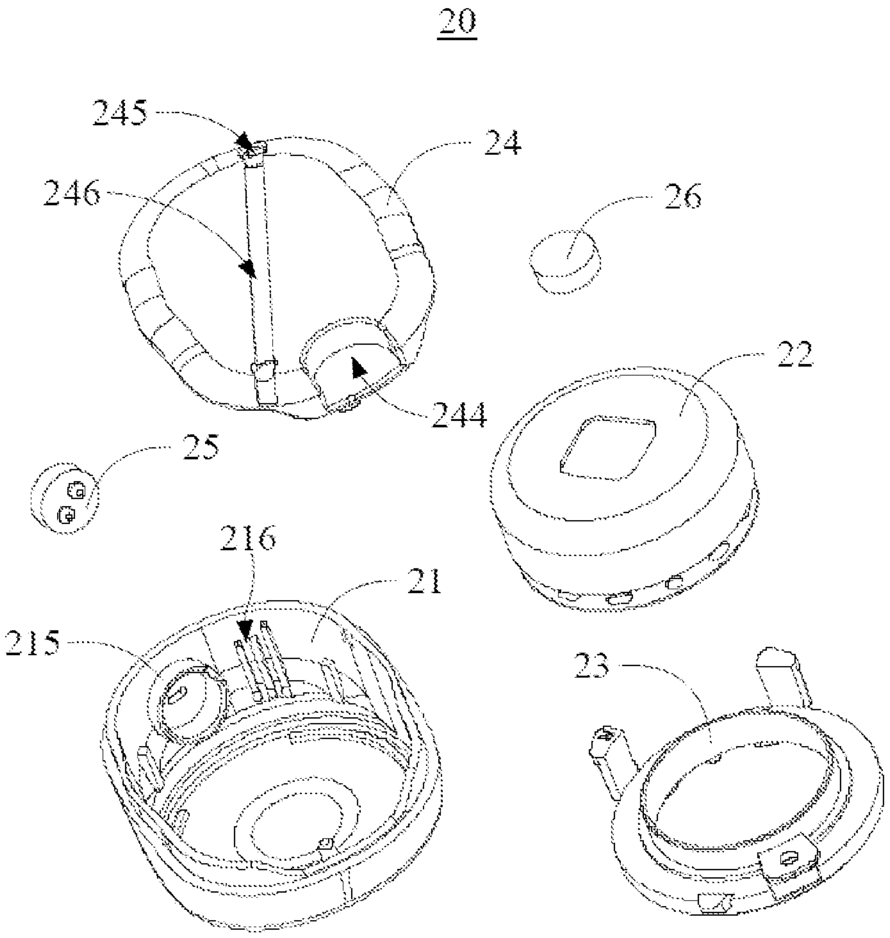
FIG. 21 is a schematic diagram of a breakdown structure of the core module in FIG. 16 from another perspective according to some embodiments of the present disclosure.

FIG. 21 is a schematic diagram of a breakdown structure of the core module in FIG. 16 from another perspective according to some embodiments of the present disclosure. As shown in FIG. 21, the core module 20 may further include a first microphone 25 and a second microphone 26. After the cover plate 24 is disposed on the opening end of the core housing 21, the cover plate 24 and the core housing 21 may form a chamber structure for accommodating the core 22. At this time, the first microphone 25 may be accommodated in the core housing 21. The second microphone 26 may be disposed outside the core housing 21. In such cases, the cover plate 24 may separate the first microphone 25 and the second microphone 26, thereby avoiding a generation of interference between the first microphone 25 and the second microphone 26 (e.g., back tone chambers of the first microphone 25 and the second microphone 26). In such cases, the cover plate 24 may increase the rigidity of the structure of the opening end of the core housing 21 (e.g., the cover plate 24 and the earphone fixing portion 311). In addition, the cover plate 24 may press the core bracket 23 in the core housing 21. The first microphone 25 and the second microphone 26 may be separated. Further, the cover plate 24 may achieve "one piece with three functions." Further, when the ear hook housing 31 is covered by the cover plate 24, that is, when the earphone fixing portion 311 is covered on one side of the cover plate 24 away from the core housing 21, the second microphone 26 may be disposed between the cover plate 24 and the earphone fixing portion 311.

In some embodiments, the first microphone 25 and the second microphone 26 may be connected with the main circuit board 50 to transmit the sound to the main control circuit board 50. A type of one of the first microphone 25 and the second microphone 26 may include an electric type, a capacitive type, a piezoelectric type, a carbon particle type, a semiconductor type, or the like, or any combination thereof. For example, one of the first microphone 25 and the second microphone 26 may include an electret pickup, a silicon pickup, etc. The first microphone 25 and the second microphone 26 may be configured to pick up the sound of the environment where the user (e.g., a wearer) is located, so that the bone conductor headphone 10 may perform a noise reduction, thereby improving the user favorability of the bone conduction earphone 10. In addition, the first microphone 25 and the second microphone 26 may also be configured pick up a voice of the user, so that the bone conductor headphone 10 may realize a microphone function while achieving a speaker function, thereby expanding an application range of the bone conductor headphone 10. The first microphone 25 and the second microphone 26 may also pick up the voice of the user and the sound of the environment thereof. In such cases, the bone conductor headphone 10 may achieve the microphone function while performing the noise reduction, thereby improving the user favorability of the bone conduction earphone 10.

As shown in FIG. 21, an annular flange 215 may be disposed in an inner side of the annular peripheral wall 212. The first microphone 25 may be embedded and fixed in the annular flange 215. One side of the cover plate 24 (e.g., the cover plate body 241) that is away from the core housing 21 may include a recess disposed with a microphone accommodation groove 244. The second microphone 26 may be disposed in the microphone accommodation groove 244, and covered by the earphone fixing portion 311. After the second microphone 26 is disposed between the cover plate 24 and the earphone fixing portion 311, an overall thickness of the bone conduction earphone 10 may be reduced, thereby increasing the feasibility and reliability of the second microphone 26, the cover plate 24, and the earphone fixing portion 311. In other words, the first microphone 25 may be fixed on the annular peripheral wall 212. The second microphone 26 may be fixed on the cover plate 24. At this time, in order to facilitate the first microphone 25 and the second microphone 26 to pick up the voice of the user and/or the sound of the environment thereof, a pike-up hole (not shown in FIG. 21) may be opened at a position on the annular peripheral wall 212 corresponding to the first microphone 25. A pike-up hole (not shown in FIG. 21) may be opened at a position on the earphone fixing portion 311 corresponding to the second microphone 26. An acoustic direction of the first microphone 25 may be disposed parallel to the cover plate 24 or inclined relative to the cover plate 24. An acoustic direction of the second microphone 26 may be perpendicular to the cover plate 24. In such cases, the first microphone 25 and the second microphone 26 may pick up the sound from different directions to increase the noise reduction and/or the microphone effect of the bone conductor headphone 10, thereby improving the user favorability of the bone conductor headphone 10.

It should be noted that the acoustic direction of the first microphone 25 may be perpendicular to the annular peripheral wall 212. Based on the above detailed description, the plane where the cover plate 24 (e.g., the cover plate body 241) is located may be parallel to the plane where the bottom wall 211 is located. The annular peripheral wall 212 may be perpendicular to the bottom wall 211. Alternatively, the annular peripheral wall 212 may be inclined outward relative to the bottom wall 211 at an angle. For example, the inclination angle may be less than or equal to 30 degrees. In such cases, when the annular peripheral wall 212 is perpendicular to the bottom wall 211, the acoustic direction of the first microphone 25 may be parallel to the cover plate 24. When the annular peripheral wall 212 is inclined outward relative to the bottom wall 211, the acoustic direction of the first microphone 25 may be inclined relative to the cover plate 24. The inclination angle of the annular peripheral wall 212 and the inclination angle of the acoustic direction may be substantially equal.

In some embodiments, a projection of the second microphone 26 on the cover plate 24 and a projection of the first microphone 25 on the cover plate 24 may be staggered from each other. In such cases, the first microphone 25 and the second microphone 26 may pick up the sound from different directions to increase the noise reduction and/or the microphone effect of the bone conductor headphone 10, thereby improving the user favorability of the bone conductor headphone 10. The projection of the second microphone 26 on the cover plate 24 may be disposed closer to the bending transition portion 312 than the projection of the first microphone 25 on the cover plate 24. In such cases, a relative distance between the first microphone 25 and the second microphone 26 may be increased. The first microphone 25 and the second microphone 26 may further pick up the sound from different directions. In some embodiments, the relative distance may be as large as possible.

It should be noted that under the perspective shown in FIG. 21, the first microphone 25 and the second microphone 26 may be located on opposite sides of the cover plate 24, respectively. The first microphone 25 may be located on a back surface of the cover plate 24, so that the projection of the first microphone 25 on the cover plate 24 may be actually invisible. Therefore, in order to facilitate the description, the first microphone 25 and the second microphone 26 may be simply considered to be located on a same side of the cover plate 24. The projection of the first microphone 25 on the cover plate 24 may be replaced with a dashed frame.

Figure 22:
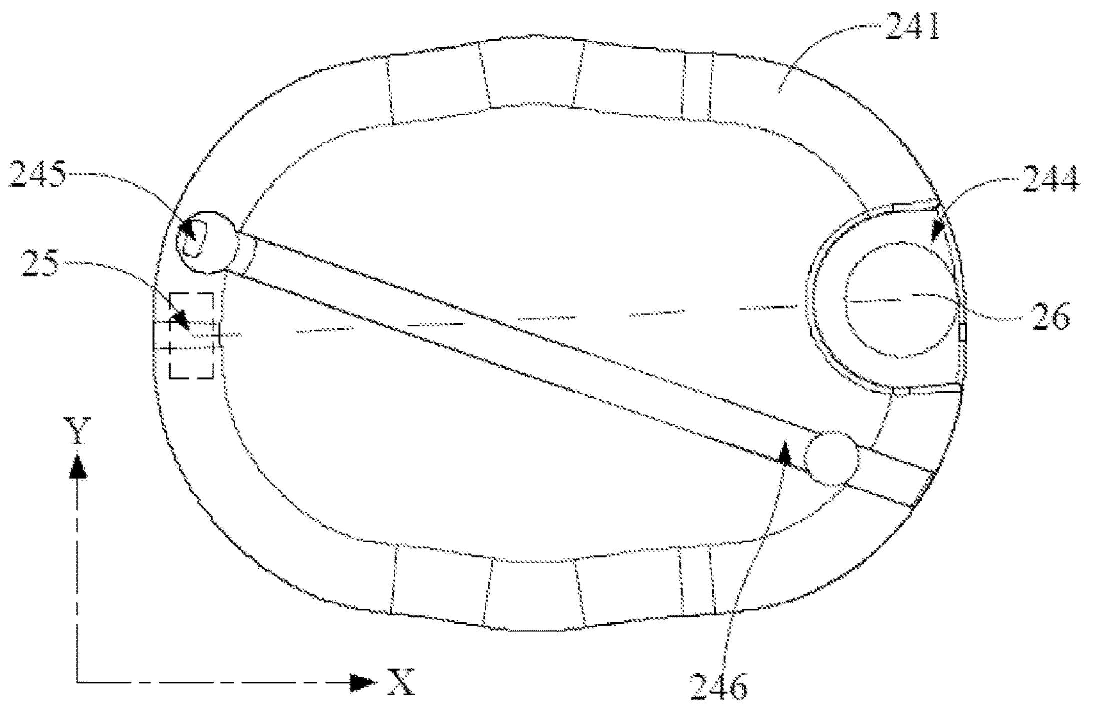
FIG. 22 is a schematic diagram illustrating a top view of the cover plate in FIG. 21 according to some embodiments of the present disclosure.

FIG. 22 is a schematic diagram illustrating a top view of the cover plate in FIG. 21 according to some embodiments of the present disclosure. As shown in FIG. 22, the cover plate 24 may include a long axis direction (e.g., a direction indicated by a dotted line X in FIG. 22) and a short axis direction (e.g., a direction indicated by a dotted line Y in FIG. 22). The size of the cover plate 24 in the long axis direction may be larger than the size of the cover plate 24 in the short axis direction. In some embodiments, an included angle between a line (e.g., a dotted line shown in FIG. 22)

of the projection of the second microphone 26 on the cover plate 24 and the projection of the first microphone 25 on the cover plate 24 and the long axis direction may be less than 45 degrees. For example, the angle may be less than or equal to 10 degrees. As another example, the line of the projection of the second microphone 26 on the cover plate 24 and the projection of the first microphone 25 on the cover plate 24 may be overlapped with the long axis direction. In such cases, the projection of the second microphone 26 on the cover plate 24 and the projection of the first microphone 25 on the cover plate 24 may be staggered. The relative distance between the first microphone 25 and the second microphone 26 may be increased, thereby further causing the first microphone 25 and the second microphone 26 to pick up the sound from different directions. The projection of the second microphone 26 on the cover plate 24 may be disposed closer to the bending transition portion 312 than the projection of the first microphone 25 on the cover plate 24.

Based on the above detailed description, the core 22 and the first microphone 25 may be disposed in the core housing 21. The cover plate 24 may be also covered on the opening end of the core housing 21. For easy wiring, corresponding through holes and grooves may be disposed on the cover plate 24. As shown in FIG. 21 and FIG. 16, a threaded hole 245 may be also disposed on the cover plate 24. Since the projection of the second microphone 26 on the cover plate 24 is disposed closer to the bending transition portion 312 than the projection of the first microphone 25 on the cover plate 24, the threaded hole 245 may be disposed close to the first microphone 25. In such cases, the leading wire connecting the first microphone 25 and the main control circuit board 50 (not shown in FIG. 21 and FIG. 16) may be extended from the core housing 21 to one side of the cover plate 24 that is away from the core housing 21 through the threaded hole 245, and further extended to the accommodation bond 313 through the wiring channel in the bending transition portion 312. At this time, after the earphone fixing portion 311 covers the cover plate 24, a portion of the leading wire (a length of which is equal to or greater than a linear distance between the threaded hole 245 and the second microphone 26) may be located between the cover plate 24 and the earphone fixing portion 311.

In some embodiments, as shown in FIG. 21 and FIG. 16, one side of the cover plate 24 that is away from the core housing 21 may further include a recess disposed with a wiring groove 246. One end of the wiring groove 246 may be in communication with the threaded hole 245. The leading wire may be further extended along the wiring groove 146. In such cases, an overall thickness that a portion of the leading wire is disposed between the cover plate 24 and the earphone fixing portion 311, thereby increasing the feasibility and reliability of the leading wire, the cover plate 24, and the earphone fixing portion 311.

It should be noted that after the leading wire is traveled from the threaded hole 245 and the wiring groove 246 in the core housing 21, glue may be dispensed at least at two ends of the wiring groove 246, so that the leading wire may be relatively fixed with the cover plate 24. Further, the compactness of the cover plate 24, the earphone fixing portion 311, and the leading wire may be increased. The point glue performed at the threaded hole 245 may also improve the airtightness of the core module 20.

In some embodiments, as shown in FIG. 21, two wire management grooves 216 may be disposed in parallel in the inner side of the annular peripheral wall 212. The two wire management grooves 216 may be close to the annular flange 215. Two welded joints formed between positive and negative outer wires (not shown in FIG. 21) and positive and negative terminals of the core 22 (not shown in FIG. 21) may be accommodated in the two wire management grooves 216, respectively. In such cases, short-circuits may be avoided when the positive and negative terminals of the core 22 are welded to positive and negative anodes of the above leading wires, thereby increasing the reliability of the wiring of the core 22.

In some embodiments, when the bone conductor earphone 10 is also disposed with the button 36 as shown in FIG. 4, one side of the cover plate 24 that is away from the core housing 21 may be disposed with a button accommodation groove (as shown in FIG. 1, but not marked). The button 36 may be disposed in the button accumulation groove and covered by the earphone fixing portion 311. In such cases, after the button 36 is disposed between the cover plate 24 and the earphone fixing portion 311, the overall thickness of the bone conductor earphone 10 may be reduced, thereby increasing the feasibility and reliability of the button 36, the cover plate 24, and the earphone fixing portion 311. At this embodiment, the button accommodation groove may be similar to the above microphone accommodation groove 244.

It should be noted that the accommodation bin 313 shown in FIG. 2 may be configured to accommodate the main circuit board 50. The accommodation bin 313 shown in FIG. 4 may be configured to accommodate the battery 60. Therefore, each of the first microphone 25 and the second microphone 26 may correspond to the ear hook assembly 30 as shown in FIG. 2, so that the first microphone 25 and the second microphone 26 may be connected with the main control circuit board 50, thereby shortening a distance of the wiring. In addition, since volumes of the core module 20 and the ear hook assembly 30 are limited, if the button 36 is disposed with the first microphone 25 and the second microphone 26, the button 36, the first microphone 25, and the second microphone 26 may result in interference. Therefore, the button 36 may correspond to the ear hook assembly 30 shown in FIG. 4. In other words, if the button 36 corresponds to the left ear hook of the bone conduction earphone 10, the first microphone 25 and the second microphone 26 may correspond to the right ear hook of the bone conduction earphone 10. Conversely, if the button 36 corresponds to the right ear hook of the bone conduction earphone 10, the first microphone 25 and the second microphone 26 may correspond to the left ear hook of the bone conduction earphone 10. In some embodiments, for the core module 20 as shown in FIG. 8, since the core module 20 includes no cover plate 24 of the core module 20 as shown in FIG. 16, related structures of the first microphone 25, the second microphone 26, the buttons 36, etc., may be adjusted accordingly. For example, the bone conduction earphone 10 may include one of the first microphone 25 or the second microphone 26. Alternatively, the bone conduction earphone 10 may include the first microphone 25 and the second microphone 26. When one of the first microphone 25 and the second microphone 26 corresponds to the left ear hook of the bone conduction earphone 10, the other of the first microphone 25 and the second microphone 26 may correspond to the right ear hook of the bone conduction earphone 10. As another example, the button 36 may be fixed on one side of the earphone fixing portion 311 close to the core housing 21.

Figure 23:
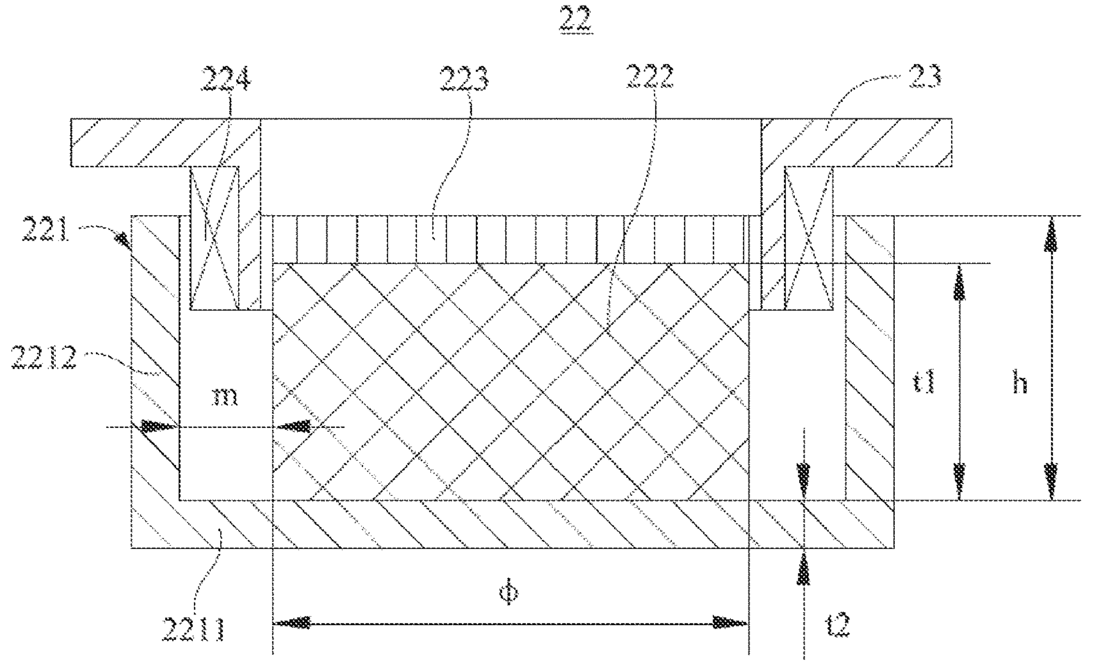
FIG. 23 is a schematic diagram illustrating a core according to some embodiments of the present disclosure.

FIG. 23 is a schematic diagram illustrating a core according to some embodiments of the present disclosure. As shown in FIG. 23, the core 22 may include a magnetic conduction shield 221, a magnet 222, a magnetic conduction plate 223, and a coil 224. The magnetic conduction shield 221 may include a bottom plate 2211 and an annular side plate 2212 integrally connected with the bottom plate 2211. Further, the magnet 222 may be disposed in the annular side plate 2212 and fixed on the bottom plate 2211. The magnetic conduction plate 223 may be fixed on one side of the magnet 2211 that is away from the bottom plate 2211. The coil 224 may be disposed in a magnetic gap 225 between the magnet 222 and the annular side plate 2212, and fixed on the core bracket 23. In some embodiments, the magnetic gap 225 between the magnet 222 and the annular side plate 2212 may be m. m may be larger than or equal to a first gap and less than or equal to a second gap, to balance motion requirements of the coil 224 and compactness of the core 22. For example, m may be in a range of 1.0 millimeter to 1.5 millimeters.

It should be noted that the core shown in FIG. 23 may be applied to the core module shown in FIG. 8 or the core module shown in FIG. 16. The core bracket shown in FIG. 23 is for the convenience of describing the relative position relationship between the core bracket and the core, which may further implicitly indicate a possible assembly manner between the core bracket and the core.

In some embodiments, the magnet 222 may include a metal alloy magnet, a ferrite, or the like. For example, the metal alloy magnet may include neodymium iron boron (NdFeB), samarium cobalt, aluminum nickel cobalt, iron chromium cobalt, aluminum iron boron, iron carbon aluminum, or the like, or any combination thereof. The ferrite may include barium ferrite, steel ferrite, magnesium manganese ferrite, lithium manganese ferrite, or the like, or any combination thereof. In some embodiments, the magnet 222 may include a magnetization direction to form a relatively stable magnetic field.

The magnetic conduction shield 221 and the magnetic conduction plate 223 may cooperate with each other for adjusting the magnetic field generated by the magnet 222 to increase the utilization of the magnetic field. The magnetic conduction shield 221 and the magnetic conduction plate 223 may be processed by a soft magnetic material, such as metal materials, metal alloys, metal oxide materials, amorphous metal materials, etc. For instance, the above soft magnetic material may include iron, iron silicon alloy, iron aluminum alloy, nickel iron alloy, iron cobalt alloy, a low carbon steel, a silicon steel sheet, a coiled silicon steel sheet, ferrite, etc.

In such cases, the coil 224 may be located in the magnetic field formed by the magnet 222, the magnetic conduction shield 221, and the magnetic conduction plate 223. Under the excitation of electrical signals, the coil 224 may be subjected to an ampere force. The coil 224 may cause the core 22 to generate mechanical vibrations under the driving of the ampere force. The core 22 may be fixed in the core housing 21 through the core bracket 23, so that the core housing 21 may be vibrated with the core 22. In this embodiment, an electric resistance of the coil 224 may be a present electric resistance (e.g., 8 Ohms (Ω)) to balance generation requirements of the ampere force and the circuit structure of the core 22.

Based on the above detailed description, the volume of the core housing 21 may be limited. The core housing 21 may at least accommodate structural members such as the core 22, the core bracket 23, the first microphone 25, etc. Although a larger ampere force may be obtained by increasing a size of the core 22 (e.g., increasing a volume of the magnet 222 and/or increasing a count of turns of the coil 224) to better driving the core housing 21, a weight and volume of the core module 20 may be increased, which is not conducive to the lightness of the core module 20. To this end, the core 22 may be improved and designed based on the ampere-based formula $F=BIL\sin\theta$ according to some embodiments of the present disclosure. The parameter B may represent an intensity of the magnetic field formed by the magnet 222, the magnetic conduction shield 221, and the magnetic conduction plate 223. The parameter L may represent a valid length of the coil 224 in the magnetic field. The parameter θ may represent an included angle of a current and the magnetic field. For instance, θ may be equal to 90 degrees. The parameter I may represent a current at a certain moment in the coil 224. For a designed, manufactured, and assembled core 22, the parameters B and L may be determined values. The parameter I may vary with the variation of the electrical signal input in the core 22. Therefore, the optimization design of the core 22 may be simply considered to be an optimized design on a force coefficient BL. The parameters B and L may be dependent on structural parameters (e.g., shapes, sizes, etc.) of the magnet 222, the magnetic housing 221, and the magnetic conduction plate 223.

Figure 24:
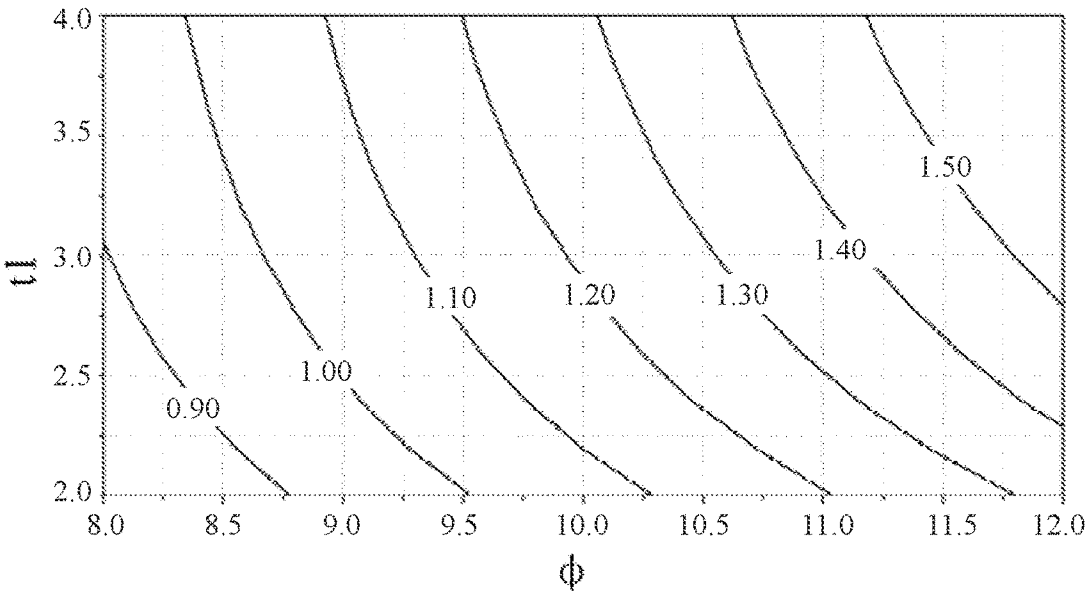
FIG. 24 is a schematic diagram illustrating a relationship between a force coefficient BL and a magnet in FIG. 23 according to some embodiments of the present disclosure.

Effect of the structural parameters (e.g., the shape, size, etc.) of the magnet 222, the magnetic housing 221, and the magnetic conduction plate 223 on the force coefficient BL may be described in detail. In some embodiments, the magnet 222 may be cylindrical. FIG. 24 is a schematic diagram illustrating a relationship between a force coefficient BL and the magnet in FIG. 23 according to some embodiments of the present disclosure. As shown in FIG. 24, an abscissa is a diameter φ of the magnet 222. An ordinate is a thickness t1 of the magnet 222. It may be obtained without doubt that the larger the diameter φ of the magnet 222, the larger the value of the force coefficient BL. The larger the thickness t1 of the magnet 222, the larger the value of the force coefficient BL. In some embodiments, in order to cause the bone conductor headphone 10 to generate a sufficient volume, that is, to generate a sufficiently large ampere force to drive the coil 224 to vibrate, the value of the force coefficient BL may be larger than a force coefficient threshold. Merely by way of example, the force coefficient threshold may be 1.3. In some embodiments, based on a comprehensive consideration of the weight and volume of the core module 20 (e.g., the core 22), the diameter φ of the magnet 222 may be larger than or equal to a first diameter and less than or equal to a second diameter. For example, the diameter φ may be in a range of 10.5 millimeters to 11.5 millimeters. As another example, the diameter φ of the magnet 222 may be 10.8 millimeters. The thickness t1 of the magnet 222 may be larger than or equal to a first thickness and less than or equal to a second thickness. For example, thickness t1 of the magnet 222 may be in a range of 3.0 millimeters to 4.0 millimeters. As another example, the thickness t1 of the magnet 222 may be 3.5 millimeters.

Figure 25:
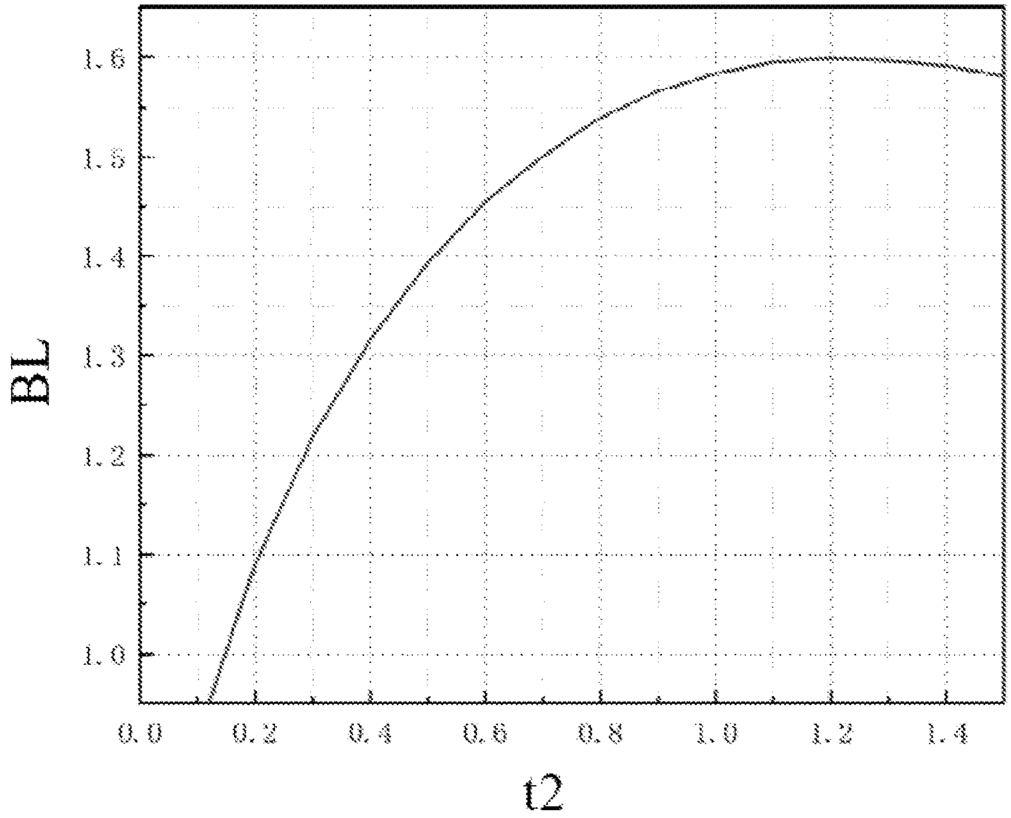
FIG. 25 is a schematic diagram illustrating a relationship between thicknesses of a magnetic conduction shield and a magnetic conduction plate in FIG. 23 and a force coefficient BL according to some embodiments of the present disclosure.

In some embodiments, a diameter of the magnetic conduction plate 223 may be equal to the diameter of the magnet 222. A thickness of the magnetic conduction plate 223 may be equal to the thickness of the magnetic conduction shield 221. A material of the magnetic conduction plate 223 may be the same as a material of the magnetic conduction shield 221. FIG. 25 is a schematic diagram illustrating a relationship between thicknesses of the magnetic conduction shield and the magnetic conduction plate in FIG. 23 and a force coefficient BL according to some embodiments of the present disclosure. As shown in FIG. 25, an abscissa is a thickness t2 of the magnetic conduction shield 221. An ordinate is a force coefficient BL. It may be obtained without doubt that within a certain range, a value of the force coefficient BL may increase as the thickness t2 increases. When t2 is larger than 0.8 millimeters, the variation of the value of the force coefficient BL may not be obvious. That is, when t2 is larger than 0.8 millimeters, the continued increase of the thickness t2 may not only bring little benefit but also increase the weight of the core 22. Therefore, based on the comprehensive consideration of the force coefficient BL (e.g., larger than 1.3) and the weight and volume of the core module 20 (e.g., the core 22), the thickness t2 of the magnetic conduction plate 223 and/or the magnetic conduction shield 221 may be larger than or equal to a third thickness and less than or equal to a fourth thickness. For example, the thickness t2 may be in a range of 0.4 millimeters to 0.8 millimeters. As another example, the thickness t2 may be 0.5 millimeters.

Figure 26:
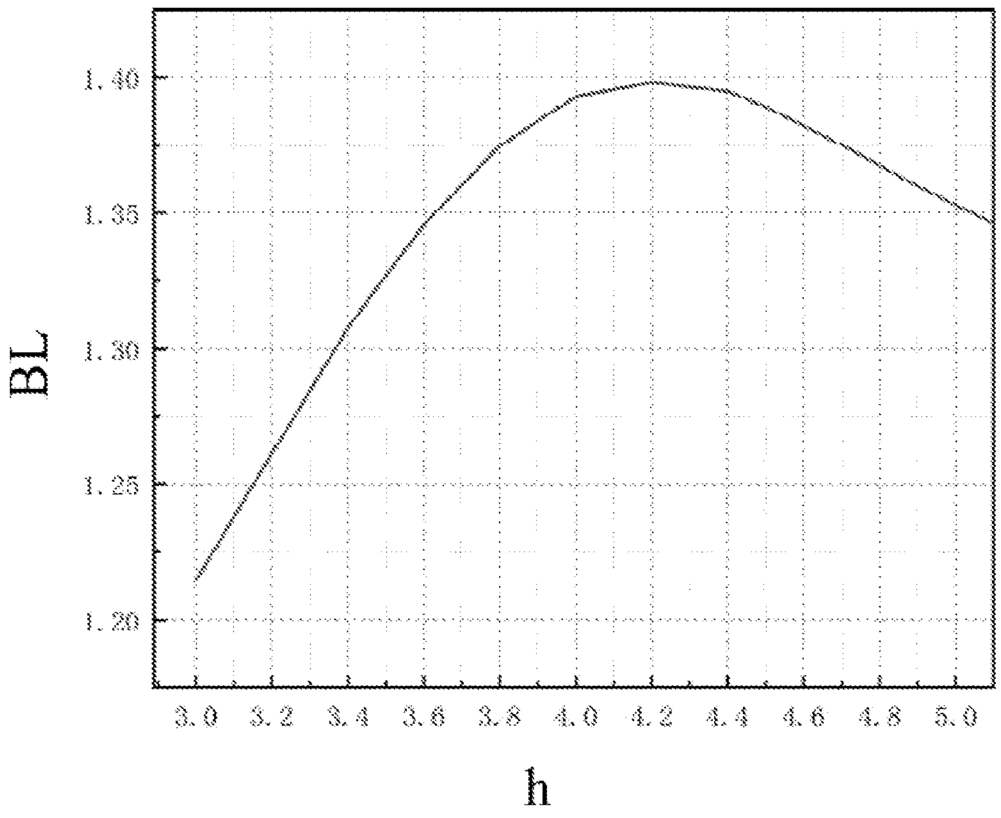
FIG. 26 is a schematic diagram illustrating a relationship between a height of the magnetic conduction shield in FIG. 23 and a force coefficient BL according to some embodiments of the present disclosure.

In some embodiments, the annular side plate 2212 may also be cylindrical. A diameter D of the annular side plate 2212 may be a sum of the diameter φ of the magnet 222 and twice the magnetic gap m. That is, the diameter D of the annular side plate 2212 may be determined according to Equation D=φ+2 m. FIG. 26 is a schematic diagram illustrating a relationship between a height of the magnetic conduction shield in FIG. 23 and a force coefficient BL according to some embodiments of the present disclosure. As shown in FIG. 26, an abscissa is a height h of the magnetic conduction shield 221 (e.g., the annular side plate 2212). An ordinate is a force coefficient BL. It may be obtained without doubt that within a certain range, the value of the force coefficient BL may increase with the increase of the height h of the magnetic conduction shield 221. However, after the height h is greater than 4.2 millimeters, the value of the force coefficient BL may be decreased with the increase of the height h of the magnetic conduction shield 221. Therefore, based on the comprehensive consideration of the force coefficient BL (e.g., larger than 1.3) and the weight and volume of the core module 20 (e.g., the core 22), the height h of the magnetic conduction shield 221 may be larger than or equal to a first height and less than or equal to a second height. For example, the height h of the magnetic conduction shield 221 may be in a range of 3.4 millimeters to 4.0 millimeters. As another example, the height h of the magnetic conduction shield 221 may be 3.7 millimeters.

Referring to FIG. 1, the bone conduction earphone 10 may include two core modules 20. One of the two core modules 20 may correspond to the core module shown in FIG. 8, and the other may correspond to the core module shown in FIG. 16. It should be noted that a specific structure of each core module 20 may be the same as or similar to one of the above embodiments, which may be referred to the detailed description of any of the above embodiments and not be repeated herein. In some embodiments, the account of core module 20 may not be limited to two. For example, the bone conduction earphone 10 may be provided with three or more core modules 20. As another example, in some application scenarios where stereophonic requirement is not particularly high, such as hearing aids for hearing patients, live teleprompter for hosts, etc., the bone conduction earphone 10 may also be provided with only one core module 20. As a further example, the earphone may further include an air conduction earphone (e.g., a single-ear air conduction earphone) provided with a core module 20, and the air conduction earphone may be hung on the user's auricle through a fixing component (e.g., an ear hook assembly), and transmits a sound signal to the user through one or more sound guiding holes.

Figure 27:
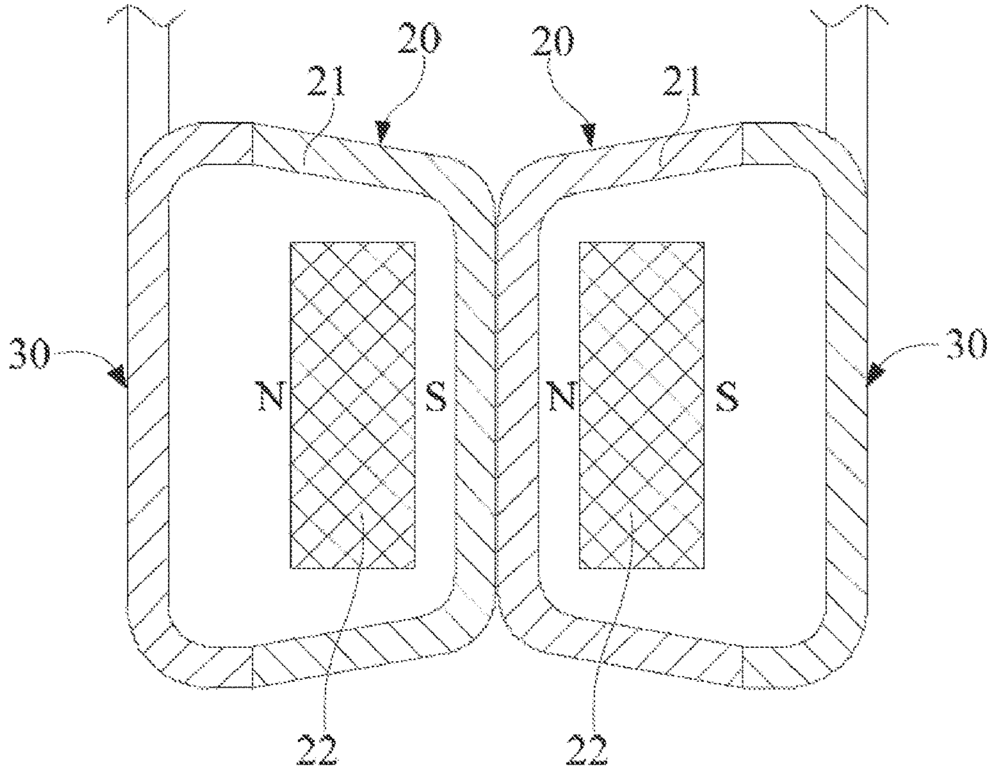
FIG. 27 is a schematic diagram illustrating a state of the bone conduction earphone shown in FIG. 1 under a non-wearing state according to some embodiments of the present disclosure.

In some embodiments, the magnet 222 may also be configured to cause the core module 20 attachable to a magnetic object. For example, the magnet 222 may be disposed close to the bottom wall 211 of the core housing 21, so that the core module 20 may have magnetism on the side close to the bottom wall 211. In such cases, the core module 20 may be attachable to the magnetic object through the side of the bottom wall 211. The magnetic object includes a metal member (e.g., a bracket), a mobile device (e.g., a mobile phone), a charging device (e.g., a magnetic charging device), another core module (e.g., two core modules 20 that are attachable to each other as shown in FIG. 27), etc. that may be attracted by the magnet 222, or the like, or any combination thereof.

Taking the magnetic object including a charging device as an example, the bottom wall 211 of the core housing 21 may be disposed with a magnetic suction connector. When the earphone is charged, the magnetic suction connector and a corresponding power interface of the charging device may form a system. The magnetic suction connector and the corresponding power interface of the charging device may be matched with each other in structure so as to be attracted together, so that an electrical connection may be established to charge the earphone. For example, the magnet 222 may be disposed on an inner side of the bottom wall 211 (i.e., a side of the bottom wall 211 that is away from the user's head) as a part of the magnetic suction connector, so that the magnetic suction connector may be attracted on the power interface of the charging device. An outer side of the bottom wall 211 (i.e., a side of the bottom wall 211 facing the user's head) may be disposed with a charging terminal. One side of the charging terminal may be electrically connected to the power interface of the charging device, and the other side may be connected to the battery 60 of the earphone (e.g., through a leading wire) such that the charging terminal may cooperate with the power interface to charge the earphone. In some embodiments, the charging terminal may be omitted. The earphone may be directly attached to the charging device through the magnet 222 for wireless charging. Exemplary wireless charging manners may include electromagnetic induction wireless charging, magnetic field resonance wireless charging, radio wave wireless charging, solar charging, or the like, or any combination thereof. In some embodiments, the charging device may include a stationary charging device, a mobile charging device, or the like.

In some embodiments, the bone conduction earphone 10 may include two core modules 20. The magnet 222 may be configured to enable the two core modules 20 to adsorb each other. FIG. 27 is a schematic diagram illustrating a state of the bone conduction earphone shown in FIG. 1 under a non-wearing state according to some embodiments of the present disclosure. As shown in FIG. 27, the magnets 222 of the two core modules 20 may have different polarities on one side close to the bottom wall 211 of the core housing 21 where the magnets 222 are located. When the bone conduction earphone 10 is in a non-wearing state, the two core modules 20 may adsorb each other. Therefore, the user may store the bone conduction earphone 10. It should be noted that the magnet 222 may be also configured to form a magnetic field, so that the coil 224 may generate the vibrations under the excitation of the electrical signals. The vibration of the coil 224 may be transmitted to the auditory nerve of the human ear through bone conduction and/or air conduction, so that the human may hear the sound. At this time, the magnet 222 may achieve "one piece with two functions."

In some embodiments, before the core modules 20 are assembled, the magnets 222 may not be pre-magnetized. However, after the core modules 20 are assembled, the core modules 20 may be placed in a magnetizing device, so that the magnets 222 may have magnetic properties. After the magnetizing, magnetic field directions of the magnets 222 of the two core modules 20 may be shown in FIG. 27. In such cases, since the magnets 222 do not have the magnetic properties before the assembly, the assembly of the core modules 20 may not be interfered from a magnetic force. Therefore, the assembly efficiency and the yield rate of the core module 20 may be increased, thereby improving the productivity capacity and the and benefits of the bone conduction earphone 10.

Figure 28:
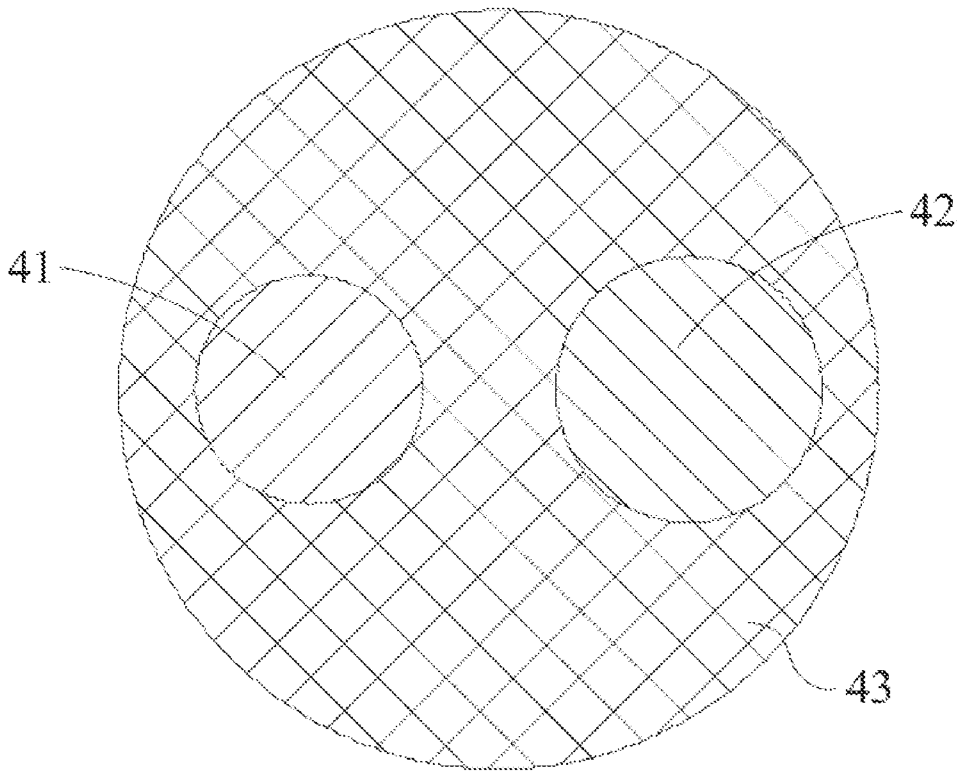
FIG. 28 is a schematic diagram illustrating a cross-sectional structure of the rear hook assembly in FIG. 1 along a direction III-III according to some embodiments of the present disclosure.

FIG. 28 is a schematic diagram illustrating a cross-sectional structure of the rear hook assembly 40 in FIG. 1 along a direction III-III according to some embodiments of the present disclosure. As shown in FIG. 28, the rear hook assembly 40 may include an elastic metal wire 41, a leading wire 42, and an elastic cladding 43 that clads the elastic metal wire 41 and the leading wire 42. The elastic cladding 43 and the leading wire 42 may be an integrally structural piece formed by extruded. The elastic cladding 43 may further form a threaded channel (not marked in FIG. 28). The elastic metal wire 41 may be inserted in the threaded channel. For example, the threaded channel may be formed during the extrusion formation. In some embodiments, a material of the elastic metal wire 41 may include spring steel, titanium alloy, titanium nickel alloy, chromium molybdenum steel, or the like, or any combination thereof. A material of the elastic cladding 43 may include polycarbonate, polyamide, silica gel, rubber, or the like, or any combination thereof, to balance the wearing comfort and the rigidity of the structure of the rear hook assembly 40.

It should be noted that since the elastic metal wire 41 is inserted in the elastic cladding 43 via the threaded channel, a region where the elastic metal wire 41 is located in FIG. 28 may be simply considered as a threaded channel in the elastic cladding 43.

In some embodiments, a diameter of the threaded channel in a natural state may be less than a diameter of the elastic metal wire 41, so that the elastic metal wire 41 may maintain fixed with the elastic cladding 43 after inserting the elastic cladding 43. In such cases, "sagging" of the rear hook assembly 40 due to an excessively large gap between the elastic cladding 43 and the elastic metal wire 41 (e.g., the rear hook assembly 40 is pressed by the user) may be avoided. The compactness of the rear hook assembly 40 may be increased.

In some embodiments, a count of the leading wires 42 may be at least two strands. Each strand of the leading wire 42 may include a metal wire and an insulation layer (not shown in FIG. 28) cladding the metal wire. The insulation layer may be configured to achieve electrical insulation between the metal wires.

In some embodiments, as shown in FIGS. 1, 2, 4, 8, and 16, since the main control circuit board 50 and the battery 60 may be disposed in two ear hook assemblies 30, and the ear hook assemblies 30 shown in FIG. 2 and FIG. 4 may correspond to the left ear hook and the right ear hook of the bone conductor headphone 10, respectively, so that the main control circuit board 50 and the battery 60 may be connected through the leading wire 42 built into the rear hook assembly 40, and the core module 20 (e.g., the core 22) corresponding to the ear hook assembly 30 in FIG. 1 (on the left) and the button 36 may be connected the main control circuit board 50 corresponding to the ear hook assembly 30 in FIG. 1 (on the right) through the leading wire 42 built into the rear hook assembly 40. The core module 20 (e.g., the core 22, the first microphone 25, and the second microphone 26) corresponding to the ear hook assembly 30 in FIG. 1 (on the right) may be further connected the battery 60 corresponding to the ear hook assembly 30 in FIG. 1 (on the left) through the leading wire 42 built into the rear hook assembly 40. Therefore, the leading wires 42 may be configured to connect the three circuits.

Figure 29:
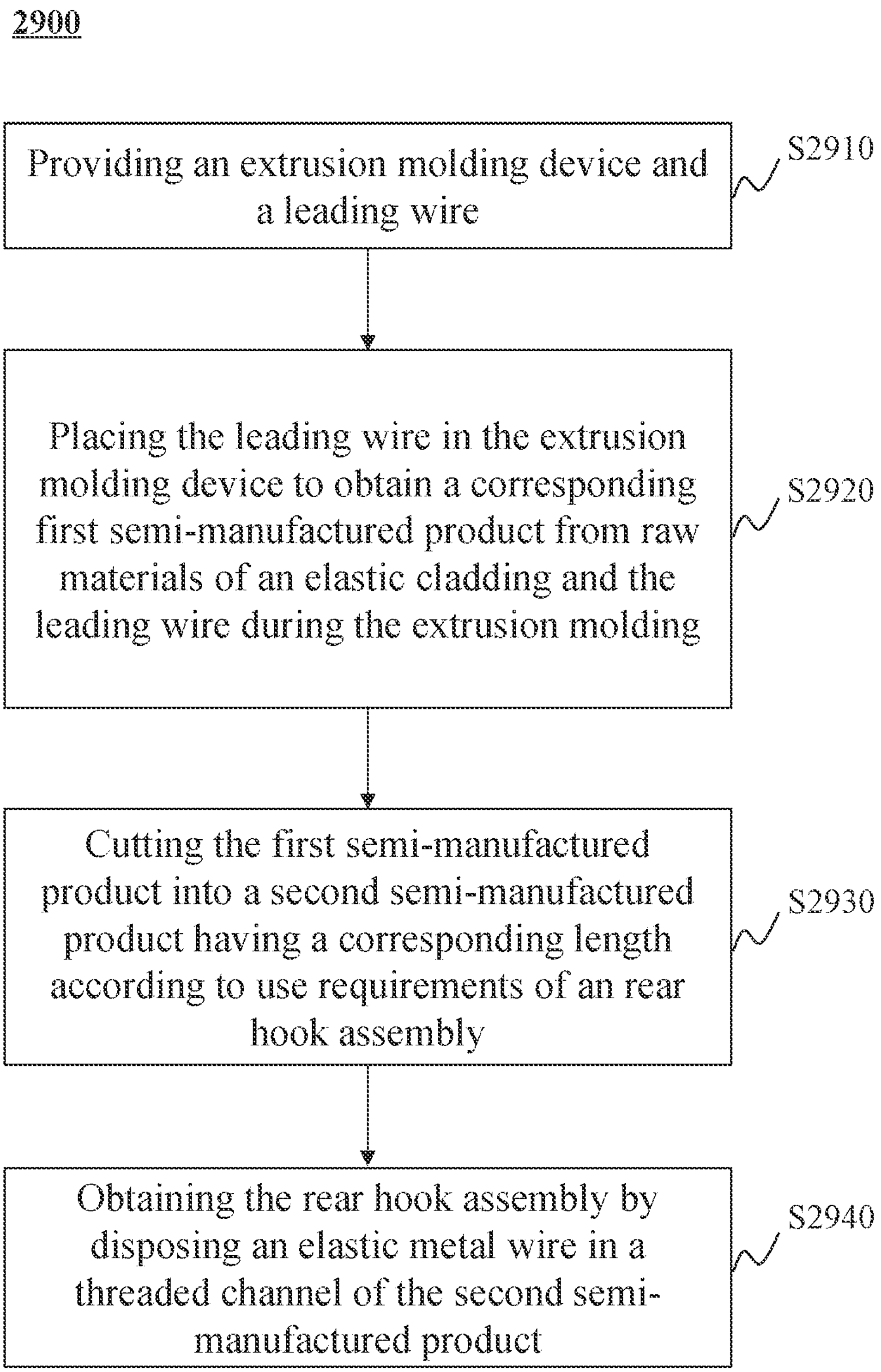
FIG. 29 is a flowchart illustrating an exemplary method for processing a rear hook assembly according to some embodiments of the present disclosure.

FIG. 29 is an exemplary flowchart illustrating a method for processing a rear hook assembly according to some embodiments of the present disclosure. Based on the above detailed description, the rear hook assembly 40 of the present disclosure may be manufactured according to the following process 2900.

Step S2910, an extrusion molding device and a leading wire may be provided. Raw materials for molding the elastic cladding 43 may be added into the extrusion molding device. During the extrusion molding, operations on the raw materials of the elastic cladding 43 may include a molten plasticization, an extrusion from a die (or a handpiece), shaping, cooling, traction, etc. The count of leading wires 42 may be at least two strands to facilitate the connection between various electronic components in the bone conduction earphone 10. In some embodiments, each strand 42 may include a metal wire and an insulation layer cladding the metal wire to facilitate an electrical insulation between the metal wires.

Step S2920, the leading wire may be placed in the extrusion molding device, so that a corresponding first semi-manufactured product may be obtained from the raw materials of the elastic cladding and the leading wire during the extrusion molding. The extrusion molding device may be configured to lead the leading wire 42 to cause the elastic cladding 43 to cover the leading wire 42 during the extrusion molding. In some embodiments, a mold core may be disposed on the handpiece of the extrusion molding device to form the above threaded channel inside the elastic cladding 43 during the extrusion molding, simultaneously. Therefore, the first semi-manufactured product may be an integrally structural piece of the elastic cladding 43 and the leading wire 42, and the inside of the elastic cladding 43 may include the threaded channel extending along the axial direction of the elastic cladding 43.

Step S2930, according to use requirements of the rear hook assembly, the first semi-manufactured product may be further cut into a second semi-manufactured product having a corresponding length. An actual length of the second semi-manufactured product may be slightly greater than a use length for the rear hook assembly. That is, the second semi-manufactured product may include an amount of margin to facilitate one or more subsequent processes.

Step S2940, the elastic metal wire may be disposed in the threaded channel of the second semi-manufactured product to obtain the rear hook assembly. After step S2940, the rear hook assembly may be formed a bending structure including a certain shape to adapt to the user's head. Two ends of the rear hook assembly may be treated accordingly to be fixedly connected with the ear hook assembly, thereby achieving a circuit connection between the main circuit board, the battery, the button, the core, the first microphone, and the second microphone. Therefore, the rear hook assembly manufactured in step S2940 may be essentially a semi-manufactured product.

Through the above manner, a semi-manufactured product (e.g., the integrally structural piece of the elastic cladding 43 and the leading wire 42) with a long length may be manufactured at one time by using the extrusion molding process. The inside of the elastic cladding 43 may include the threaded channel extending along the axial direction of the elastic cladding 43, simultaneously. The semi-manufactured product may be cut into a plurality of small sections with the corresponding length for performing the subsequent processes, which may effectively improve the production efficiency of the rear hook assembly.

The possible beneficial effects of the embodiments of the present disclosure include, but not limited to: (1) the decoration member is provided to decorate the ear hook housing, shield the leading wire, shield the button and trigger the button, thereby achieving "one piece with four functions"; (2) the magnet is designed so that when the earphones are not worn, the core modules may be attracted to each other, which is easy to store; (3) parameters such as the shape and size of the magnet and related components are reasonably set, which balances the vibration and lightness of the core module. It should be noted that different embodiments may produce different beneficial effects. In different embodiments, the possible beneficial effects may be any one or a combination of the above, or any other possible beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "device," "unit," "component," or "system." Furthermore, aspects of the present disclosure may take the form of a computer program product embodied in one or more computer-readable media having computer-readable program code embodied thereon.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially" and etc. Unless otherwise stated, "about," "approximate," or "substantially" may indicate ±20% variation of the value it describes. Accordingly, in some embodiments, the numerical data set forth in the description and attached claims are approximations that may vary depending upon the desired properties sought to be obtained by a particular embodiment. In some embodiments, numerical data should take into account the specified significant digits and use an algorithm reserved for general digits. Notwithstanding that the numerical ranges and data configured to illustrate the broad scope of some embodiments of the present disclosure are approximations, the numerical values in specific examples may be as accurate as possible within a practical scope.

What is claimed is:

1. A core module including a core housing and a core, wherein one end of the core housing includes an opening, and the core is disposed in the core housing through the opening; and the core includes a magnetic conduction shield, a magnet, a magnetic conduction plate, and a coil, wherein the magnetic conduction shield includes a bottom plate and an annular side plate integrally connected with the bottom plate, and the magnet is disposed inside the annular side plate and fixed on the bottom plate, the magnetic conduction plate is fixed on one side of the magnet that is away from the bottom plate, and the coil is disposed in a magnetic gap between the magnet and the annular side plate, wherein the magnet is configured to generate a magnetic field such that the coil located in the magnetic field generates mechanical vibrations under an excitation of electrical signals, and the magnet is further configured such that the core module is attachable to a magnetic object through a bottom wall of the core housing.

2. The core module of claim 1, wherein a diameter of the magnetic conduction plate is equal to a diameter of the magnet.

3. The core module of claim 1, wherein a thickness of the magnetic conduction plate is equal to a thickness of the magnetic conduction shield.

4. The core module of claim 1, wherein a material of the magnetic conduction plate is the same as a material of the magnetic conduction shield.

5. The core module of claim 1, wherein a thickness of the magnetic conduction shield is in a range of 0.4 mm-0.8 mm.

6. The core module of claim 5, the thickness of the magnetic conduction shield is 0.5 mm.

7. The core module of claim 1, wherein a height of the annular side plate is in a range of 3.4 mm-4.0 mm.

8. The core module of claim 7, wherein the height of the annular side plate is 3.7 mm.

9. The core module of claim 1, wherein the annular side plate is cylindrical, and a diameter of the annular side plate is a sum of a diameter of the magnet and twice the magnetic gap.

10. The core module of claim 1, further comprising a core bracket disposed in the core housing, and the coil is fixed on the core bracket.

11. The core module of claim 1, wherein the magnetic gap between the magnet and the annular side plate is in a range of 1.0 mm-1.5 mm.

12. The core module of claim 1, wherein the magnet is cylindrical, and a diameter of the magnet is in a range of 10.5 mm-11.5 mm.

13. The core module of claim 12, wherein the diameter of the magnet is 10.8 mm.

14. The core module of claim 1, wherein a thickness of the magnet is in a range of 3.0 mm-4.0 mm.

15. The core module of claim 14, wherein the thickness of the magnet is 3.5 mm.

16. The core module of claim 1, wherein the core housing includes a bottom wall configured to face a head of a user and an annular peripheral wall, one end of the annular peripheral wall being integrally connected with the bottom wall, and the opening being disposed on the other end of the annular peripheral wall that is away from the bottom wall; and the core module further includes a cover plate disposed on the opening to form a chamber structure for accommodating the core.

17. The core module of claim 16, wherein a ratio of a difference between a rigidity of the bottom wall and a rigidity of the cover plate to the rigidity of the bottom wall is less than or equal to 10%.

18. The core module of claim 16, wherein an area of the bottom wall is less than or equal to an area of the cover plate.

19. The core module of claim 16, wherein a thickness of the bottom wall is less than or equal to a thickness of the cover plate.

20. An earphone, comprising an ear hook assembly, a battery, and a core module, the core module being disposed at one end of the ear hook assembly, the battery being disposed at the other end of the ear hook assembly, and the core module including a core housing and a core, wherein one end of the core housing includes an opening, and the core is disposed in the core housing through the opening; and the core includes a magnetic conduction shield, a magnet, a magnetic conduction plate, and a coil, wherein the magnetic conduction shield includes a bottom plate and an annular side plate integrally connected with the bottom plate, and the magnet is disposed inside the annular side plate and fixed on the bottom plate, the magnetic conduction plate is fixed on one side of the magnet that is away from the bottom plate, and the coil is disposed in a magnetic gap between the magnet and the annular side plate, wherein the magnet is configured to generate a magnetic field such that the coil located in the magnetic field generates mechanical vibrations under an excitation of electrical signals, and the magnet is further configured such that the core module is attachable to a magnetic object through a bottom wall of the core housing.

* * * * *